(12) United States Patent
Fujioka et al.

(10) Patent No.: US 6,850,308 B2
(45) Date of Patent: Feb. 1, 2005

(54) LIQUID CRYSTAL DISPLAY DEVICE

(75) Inventors: Kazuyoshi Fujioka, Higashiosaka (JP);
Yozo Narutaki, Yamatokoriyama (JP);
Hisashi Nagata, Nara (JP); Kazushige Miyamoto, Yamatokoriyama (JP);
Takayuki Shimada, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 7 days.

(21) Appl. No.: 10/124,804

(22) Filed: Apr. 18, 2002

(65) Prior Publication Data
US 2002/0163615 A1 Nov. 7, 2002

Related U.S. Application Data

(62) Division of application No. 09/634,954, filed on Aug. 7, 2000, now Pat. No. 6,400,439, which is a division of application No. 08/988,607, filed on Dec. 11, 1997, now Pat. No. 6,124,917.

(30) Foreign Application Priority Data

Dec. 19, 1996 (JP) .............................................. 8-339572
Jan. 27, 1997 (JP) .............................................. 9-12939
Dec. 4, 1997 (JP) .............................................. 9-334525

(51) Int. Cl.[7] ..................... G02F 1/1333; G02F 1/1335; G02F 1/1339
(52) U.S. Cl. ....................... 349/153; 138/106; 138/110
(58) Field of Search .............................. 349/153, 158, 349/155, 42–43, 110

(56) References Cited

U.S. PATENT DOCUMENTS

| | | | |
|---|---|---|---|
| 5,155,612 A | 10/1992 | Adachi et al. | 359/80 |
| 5,379,139 A | 1/1995 | Sato et al. | 359/81 |
| 5,381,255 A | 1/1995 | Ohnuma et al. | 359/68 |
| 5,477,361 A | 12/1995 | Yanagi | 349/153 |
| 5,535,030 A | 7/1996 | Ogura et al. | 359/74 |
| 5,585,951 A | 12/1996 | Noda et al. | 349/122 |
| 5,641,974 A | 6/1997 | den Boer et al. | 257/59 |
| 5,739,888 A | 4/1998 | Ogura et al. | 349/153 |
| 6,018,380 A | 1/2000 | Hu et al. | 349/153 |
| 6,124,917 A | 9/2000 | Fujioka et al. | 349/153 |
| 6,288,764 B1 * | 9/2001 | Zhang et al. | 349/152 |
| 6,335,779 B1 * | 1/2002 | Morii et al. | 349/155 |
| 6,400,439 B1 * | 6/2002 | Fujioka et al. | 349/153 |

FOREIGN PATENT DOCUMENTS

| | | |
|---|---|---|
| JP | 58-172685 | 10/1983 |
| JP | 4-20929 | 1/1992 |
| JP | 07128670 | 5/1995 |

* cited by examiner

Primary Examiner—Toan Ton
(74) Attorney, Agent, or Firm—Nixon & Vanderhye, PC

(57) ABSTRACT

A liquid crystal display device includes a pair of opposite substrates, and a liquid crystal layer as a display medium disposed between said substrates. The pair of substrates are adhered together by a resin sealing material disposed on the periphery portion of at least one of the substrates at the prescribed gap, and an outflow preventing portion having a plurality of concave portions is provided so that at least a part of the outflow preventing portion overlaps with the sealing material.

22 Claims, 24 Drawing Sheets

Outflow preventing portion

FIG. 18
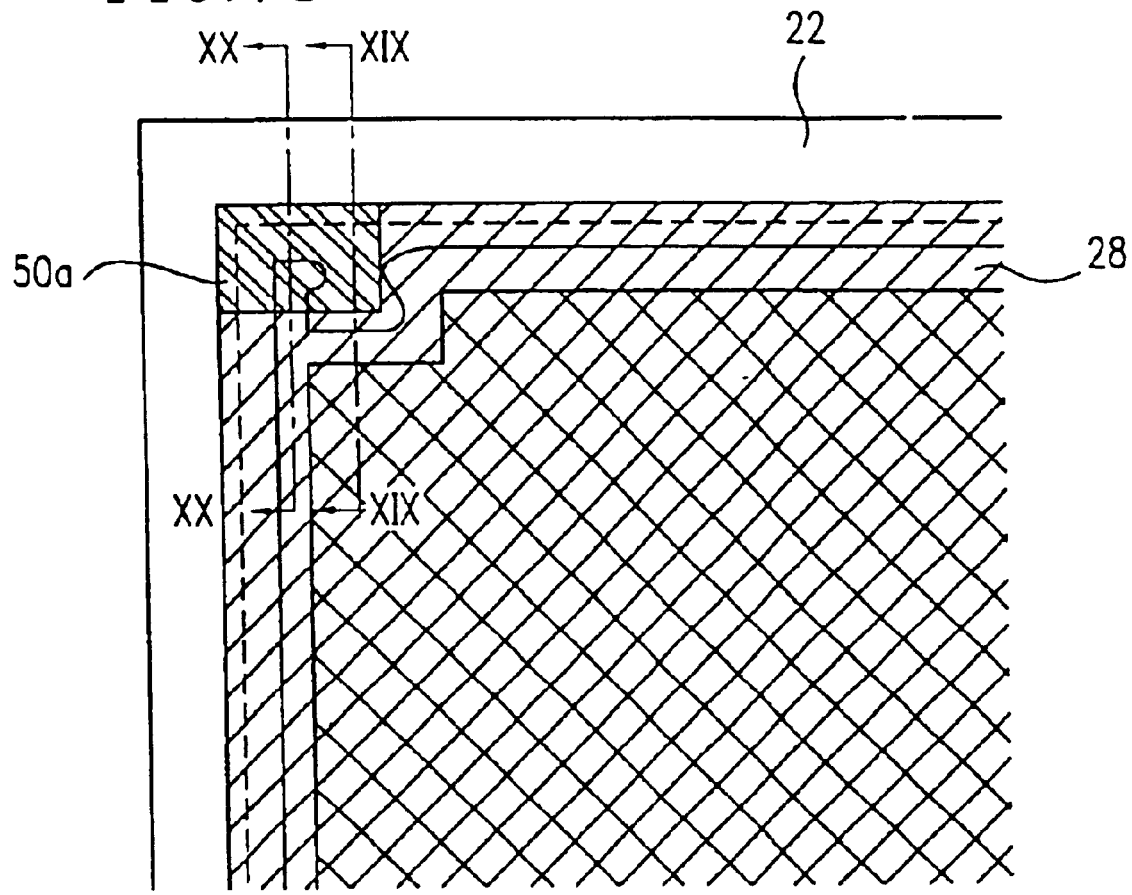
 Display region 26
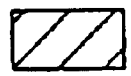 Interlayer insulating film 50
 Adhesion reinforcing portion 50a

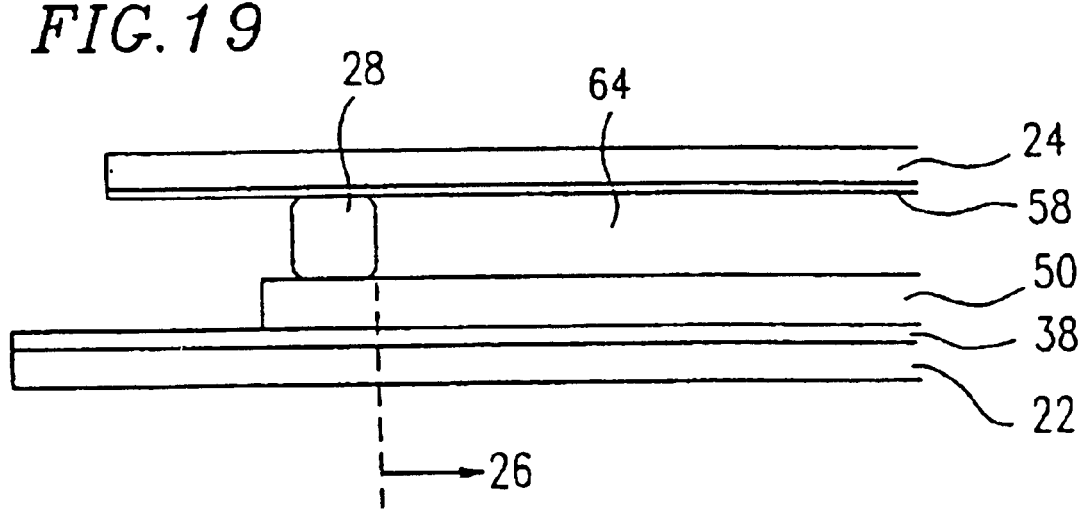
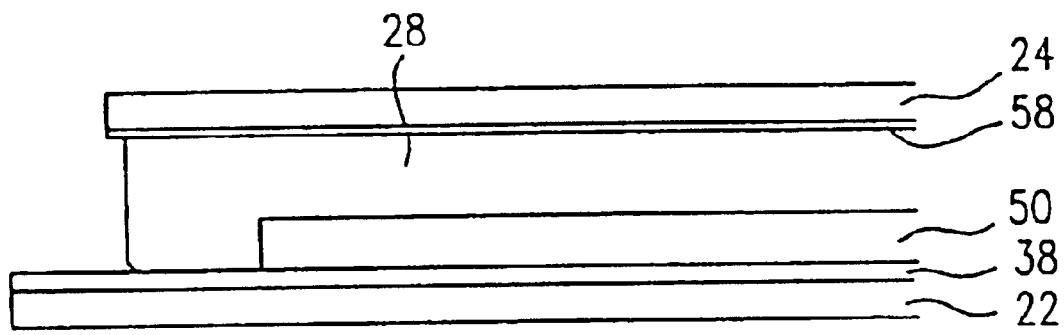

At the time of the formation of the sealing material

At the time of pressing

The completion of the sticking of the substrates

LIQUID CRYSTAL DISPLAY DEVICE

This application is a divisional of application No. 09/634,954, filed Aug. 7, 2000, now U.S. Pat. No. 6,400,439, which is a divisional of Ser. No. 08/988,607, filed Dec. 11, 1997, now U.S. Pat. No. 6,124,917.

BACKGROUND OF THE INVENTION

1. Field of the Invention

The present invention relates to a liquid crystal display device and a process for producing the same. In particular, the present invention relates to a liquid crystal display device having excellent mechanical strength as well as sealing property without any poor display caused by a sealing material, and a process for producing the same.

2. Description of the Related Art

A liquid crystal display device comprises a pair of insulating substrates (typically, glass substrates) 101 and 102, and a liquid crystal layer 110 as a display medium which is disposed between the substrates, as illustrated in FIG. 36. On the glass substrate 101, an active element (typically, thin film transistor (TFT)) which controls the electro-optical characteristics of the liquid crystal, and a scanning line and a signal line which give a gate signal and a source signal, respectively, to the active element are provided. This substrate 101 is designated as a TFT substrate (or an active matrix substrate). On the glass substrate 102, color layers 106, 107 and 108 which constitute color filters, and a black matrix 105 which is a light-shading layer are formed. This substrate 102 is designated as a color filter substrate.

Ordinarily, the TFT substrate 101 and the color filter substrate 102 are adhered together by a sealing material 103 to form a cell. In adhering these substrates, the TFT substrate 101 and the color filter substrate 102 are adhered together by using an intrasealing spacer 304 and a liquid crystal layer spacer 303 at a certain gap (a cell gap). The cell gap is approximately 4 $\mu$m to 6 $\mu$m and its variation is ±10% in the conventional TN-type liquid crystal display device.

The intra-sealing spacer 304 is included in the sealing material 103. Usually, the diameter of the intra-sealing spacer is about 5 $\mu$m. The sealing materials that can be used include thermosetting resins and ultraviolet curable resins. The sealing material is coated on either the TFT substrate or the color filter substrate in the prescribed pattern by a screen printing method, a letterpress printing method or a dispenser coating method. According to each coating method, the viscosity of the sealing material is adjusted at a level optimal for the coating. The viscosity is usually adjusted by the addition of a filler (for example, silicon oxide or alumina having a particle size of 1 $\mu$m to 3 $\mu$m). The liquid crystal layer spacer 303 is sprinkled in a portion of the substrates on which the sealing material is not coated. Usually, the diameter of the liquid crystal layer spacer is also about 5 $\mu$m. The liquid crystal layer spacer is sprinkled in an amount of about 100 pieces/mm$^2$.

In adhering the substrates, the TFT substrate and the color filter substrate are aligned, and then a sufficient load applied so that the prescribed cell gap is retained, and heated or irradiated with ultraviolet ray at that state. The heating and ultraviolet ray irradiation conditions may be varied depending upon the hardening characteristics of the sealing material, and the load may be varied depending upon the sizes of the substrates, and the area and viscosity of the sealing material, and the like. Then, a liquid crystal material is injected into the cell from an inlet formed in a portion of the sealing material 103 by, for example, a vacuum injection method, and further the inlet is sealed by, for example, an ultraviolet curable resin. Thus, the liquid crystal display device is completed.

Such a liquid crystal display device provides display information on the screen by selecting a display pixel arranged in a matrix shape. For example, an active matrix-type liquid crystal display device (a type using a switching element (an active element) such as TFT for each pixel electrode as a selective procedure of the display pixel) is capable of providing a high contrast display, and has been widely used for liquid crystal televisions, notebook-type personal computers, and the like. The switching element of the active matrix-type liquid crystal display device has the function of turning on and off a signal voltage applied between the pixel electrode and a transparent electrode (counter electrode) formed opposite to said pixel electrode through the liquid crystal layer, and displays an image information by the optical variation of the liquid crystal layer caused by the potential difference between the pixel electrode and the counter electrode.

A gate bus line which is a scanning line operating the pixel electrode and the switching element, and a source bus line which is a signal line for applying a signal voltage are usually formed through, for example, a silicon nitride insulating film of several hundreds to one thousand and several hundreds angstroms, and formed at a gap of several microns to ten and several microns.

A liquid crystal display device comprising an interlayer insulating film made from for example silicon nitride and having a thickness of several thousands angstroms which is formed on the gate bus line and the source bus line, and pixel electrodes further formed thereon has been proposed (e.g., Japanese Laid-open Publication No. 58-172685). According to this liquid crystal display device, since it is possible to form a pixel electrode also on each bus line, the area of the pixel electrodes can be enlarged to provide the increased light transmittance (i.e., aperture ratio) of the liquid crystal display device.

The following illustrates one example of the structure of an active matrix substrate used for this liquid crystal display device. FIGS. 37 and 38 are a schematic plan view and a schematic cross-sectional view of the active matrix substrate, respectively. The active matrix substrate comprises a gate electrode 609, a gate insulating film 610, a semiconductor layer 611, an n$^+$-Si layer 612 which constitutes a source and drain electrode, a metal layer 613 which constitutes a source signal line, an interlayer insulating film 607, and a transparent conductive layer 603 which constitutes a pixel electrode, all of which are formed in this order on a transparent insulating substrate 608. The pixel electrode is electrically connected to the drain electrode of the TFT through a contact hole 614 penetrating the interlayer insulating film 607. Since the interlayer insulating film is formed between the pixel electrode and the scanning and signal lines in the active matrix substrate illustrated in the figures, it is possible to form the pixel electrode as overlapping with the signal line.

On the effective display portion of the finished active matrix substrate, an alignment film made from a polyimide or the like is formed to provide an alignment function by a treatment such as rubbing, UV irradiation, and the like. Also, a transparent counter common electrode is formed using ITO (indium tin oxide) or the like on the counter substrate, and thereafter its effective display portion is subjected to the same treatment. A sealing material is coated on the periphery portion of the panel by a printing procedure or the like in such a manner that the panel is surrounded by the sealing material. An inlet is formed in a part of the sealing material. Moreover, a conductive material is attached to the signal input terminal for the counter electrode located on the active matrix substrate. Then, a spacer is sprinkled so as to provide a uniform cell gap of the liquid crystal layer, the liquid crystal layer and the counter electrode are aligned, and the sealing material is heated and cured. Thereafter, a liquid crystal is injected from the liquid crystal inlet which is then closed with a sealing material to complete the glass portion of the active matrix-type liquid crystal display device. Since a flat surface is obtained according to the liquid crystal display device using such an active matrix substrate, there is a benefit that the orientation disturbance of the liquid crystal molecules inside the display region can be prevented.

A liquid crystal display device using a photosensitive transparent acrylic resin as the interlayer insulating film has also been proposed. The acrylic resin has the following benefits: (1) providing a high transmittance in the prescribed visible light region; and (2) permitting the reduction of a capacity between each line and the pixel electrode due to easy control of the film thickness to result in the reduction of the cross talk, and the like.

However, the above-described liquid crystal display devices suffer from a problem as having poor display caused by the sealing material.

Since the sealing material includes a filler and a spacer, it has the following problems when applying a load in adhering the substrates. The conditions under which the load is imposed (for example, a period until the load reaches the prescribed level (a load imposing rate), a cell gap, and the like) may be varied depending upon the applications (the types) of the intended liquid crystal display device. Therefore, for example, when applying a large load such that a sealing material using an ultraviolet curable resin is compressed up to a level less than two-fold of the filler diameter, a separation phenomenon is observed in which a low viscous resin component contained in the sealing material is separated from the additives (e.g., the filler, the spacer) and flows out. This separation phenomenon may occur in the case of using not only an ultraviolet curable resin, but a thermosetting resin. Since the thermosetting resin is once softened with heating and thereafter cured, a rapid viscosity reduction of the resin material during the softening may cause a separation between the resin component and the additives. Although the separation phenomenon itself does not affect the characteristics of the liquid crystal display device, it may cause poor display in the case where the separated resin component flows out into the display portion. Ordinarily, the separated resin component flows through the concave portion of the uneven portion proximate to the sealing material (i.e., using the concave portion as a gutter) into the display portion. These uneven portions include an unevenness of the lines formed on the surface of the TFT substrate (having a difference in level of 3000 angstroms to 5000 angstroms), an unevenness between the black matrix of the color filter and the color layers (difference in level of about 15000 angstroms), and the like.

For the purpose of improving these problems, an attempt has been made to prevent the resin from flowing out using the concave portion as a gutter by flattening the surface of each substrate with an insulating film, and the like. However, because the resin flows out randomly, the poor display is not eliminated.

Recently, an attempt at changing the BM material of the color filter from a metal material (such as Cr or Al) to a resin material has been made for the purpose of reducing the cost. The film thickness of the metal material BM is about 2000 Å. However, when a resin material is used as the BM material, it is necessary that the film thickness of the resin material BM be about 1 μm or more so as to provide a shading property equivalent to that of a metal material. This thickness is about the same as that of the color filter (about 1.3 μm). A liquid crystal display device using a metal BM has a different cell gap between the display portion and the sealing material portion, and the diameter of the spacer sprinkled on the display portion, dLC and a cell gap of the sealing material portion (i.e., the thickness of the sealing material resin), dS have always such a relationship, dLC<dS. Therefore, the sealing material is not so compressed during adhering the substrates. On the other hand, when a resin BM is used, dLC≈dS. In general, dLC is about 5 μm, and dS is about 6 μm which is almost equivalent to dLC. Thus, the compression of the sealing material will be increased by 20% during adhering the substrates. As a result, a low viscous resin component contained in the sealing material is liable to be separated from the additives.

It is theoretically possible to solve the above-described problems by optimizing the load and heating conditions. However, because various types of liquid crystal display devices are usually manufactured using the same manufacturing apparatus, an enormous labor is required for the determination of the load and heating conditions especially at the time of introducing a novel type of manufacturing apparatus. Therefore, this attempt is not practical.

The following further illustrates the problems of an active matrix-type liquid crystal display device.

According to an active matrix-type liquid crustal display device, when a sealing material is cured in adhering the active matrix substrate to the counter substrate in, a gushing phenomenon of a solvent contained in the sealing resin may occur. That is, the bumping of the sealing material may take place with the heat due to the thermal distribution and the variation of the blended components before the sealing material is completely cured. Thus, a solvent or a component (e.g., a filler) for adjusting the viscosities of the sealing material overflows from a region in which the sealing material is originally formed. The gushing phenomenon is largely associated with the cell gap of the sealing portion, as illustrated in detail. In adhering the substrates together and curing the sealing material, the heat and pressure are simultaneously applied and the desirable cell gap is controlled by a spacer included in the sealing material and a spacer sprinkled on the substrates prior to the adhering. When a substrate gap (a cell gap) is narrow in the sealing portion, a great pressure is concentrated together with heat on the sealing material, which mainly contributes to the gushing, and in an extreme case, the gushed sealing material reaches the effective display area. Even when it does not reach the display area, there is also a reliability problem that the sealing material has a different formulation from the desirable formulation due to the gushing of the sealing material components, and thus remains uncured inside the cell even after the completion of the panel and is oozed out into the display region during using to cause poor display. For that reason, it is thought that the interlayer insulating film (which is the thickest component of the active matrix substrate) under the sealing material is removed. However, when the interlayer insulating film in this portion is completely removed by patterning, another problem arises that it is difficult to ensure the uniformity of a substrate gap (a cell gap) in the entire panel. The interlayer insulating film is formed by a spin coating method, and the like. Since the required thickness of the interlayer insulating film is generally 3 μm or more, it is extremely difficult to provide this film having a uniform film thickness in the entire portion of a large substrate. Therefore, when the interlayer insulating film is not formed under the lower portion of the sealing material and it is formed on the display region, the cell gap of the display portion is varied in accordance with the variation of the film thickness of the interlayer insulating film.

Then, there has been proposed a structure that the film thickness of a part of the interlayer insulating film under the sealing material is made thinner instead of removing it completely. FIGS. 39 and 40 are a schematic plan view of such a substrate and a cross-sectional view taken along with the B-B' line of this substrate, respectively. According to this structure, since a part of the interlayer insulating film under the sealing material has a film thickness thinner than the other part by the prescribed amount, even when the film thickness of the interlayer insulating film is varied, the film thickness of a part of the interlayer insulating film under the sealing material has the same variation, and therefore the film thickness difference between the thinner film thickness portion 604 and the other portion 607 remains at the same level. The film thickness is controlled by the exposure and development periods when the interlayer insulating film is made from a photosensitive material, and the etching period when it is made from a non-photosensitive material.

When a thinner film thickness portion is formed in the prescribed portion of the interlayer insulating film, this portion may have poorer chemical resistance than the other portion. For example, when the thinner film thickness portion is formed by an exposure and development procedure using a positive-type photosensitive resin, it is exposed to a light for a shortened suitable exposure period than the case where the film is completely removed by patterning which requires a sufficient exposure of the light, the exposure stopped at the time when its crosslinking structure is partially decomposed, and then developed. Therefore, this partially exposed portion may have poorer chemical stability compared to the non-exposed portion. Also, when it is formed by a photolithography and etching procedure using a non-photosensitive resin, the thinner film thickness portion may be structurally unstable compared to the other portion because it is exposed to an etchant, and the like. When a transparent conductive film which constitutes a pixel electrode is formed on the interlayer insulating film thus formed, defects such as film lifting and peeling may occur on the interlayer insulating film because the thinner film thickness portion of the interlayer insulating film comes into contact with the developer and the etchant.

Moreover, the adhesion of both substrates of a liquid crystal display device having an interlayer insulating film is made by a sealing material through the interlayer insulating film (for example, an acrylic resin film) on the TFT substrate. Since the sealing material has an insufficient adhesive strength to the interlayer insulating film, the resulting liquid crystal display device has insufficient mechanical strength as well as sealing property.

As described above, a liquid crystal display device having excellent mechanical strength as well as sealing property without any poor display caused by the sealing material, and a convenient process for producing the same are desirable.

SUMMARY OF THE INVENTION

The liquid crystal display device of the invention includes a pair of opposite substrates, and a liquid crystal layer as a display medium disposed between said substrates. The pair of substrates are adhered together by a resin sealing material disposed on the periphery portion of at least one of said substrates at the prescribed gap, and an outflow preventing portion having a plurality of concave portions is provided so that at least a part of said outflow preventing portion overlaps with said sealing material.

In one embodiment of the invention, said plurality of concave portions are alternatively arranged on both sides of one straight line, the adjacent concave portions arranged on both sides of said straight line are at least contacted or overlapped with each other, and the concave portions arranged on the same side of said straight line are separated from each other by a flat portion.

In another embodiment of the invention, the depth of each of said plurality of concave portions is 5000 angstroms or more.

In another embodiment of the invention, said outflow preventing portion is provided in a region located on the liquid crystal layer side from the center of the width of said sealing material and not reaching said liquid crystal layer.

In still another embodiment of the invention, said plurality of concave portions are arranged in a checkered shape.

In still another embodiment of the invention, said sealing material is continuously disposed on the four sides of the periphery portion of at least one of said substrates, and said outflow preventing portion is provided along with said sealing material.

In still another embodiment of the invention, said outflow preventing portion is provided in an interlayer insulating film formed on one of said substrates.

In still another embodiment of the invention, a color filter having color layers divided by a resin black matrix is provided on one of said pair of substrates.

In still another embodiment of the invention, the substrate having said color filter formed thereon has a flat surface in at least the vicinity of said sealing material, and the other substrate has a flat surface in at least the vicinity of said sealing material by an interlayer insulating film formed thereon.

According to another aspect of the invention, a process for producing a liquid crystal display device is provided. The method includes the steps of: forming an outflow preventing portion on the prescribed location of one of a pair of substrates; disposing a sealing material on the prescribed location of the other substrate; adhering said substrate having said outflow formed thereon to said substrate having said sealing material disposed thereon so as not to overlap said outflow preventing portion with said sealing portion; and pressing said pair of the adhered substrates to deform said sealing material into a compressed shape, and overlapping at least a part of said outflow preventing portion with said sealing material when the gap of said substrates reaches the prescribed gap.

According to still another aspect of the invention, the liquid crystal display device includes: a first substrate having a switching element, an interlayer insulating film formed on said switching element, and a pixel electrode formed on said interlayer insulating film; a second substrate adhered together to the first substrate a sealing material at the prescribed gap; and a liquid crystal layer disposed in a space defined by the first and second substrates and said sealing material. An adhesion reinforcing portion is provided in at least a part of said interlayer insulating film contacting said sealing material.

According to still another aspect of the invention, the liquid crystal display device includes: an active matrix substrate having a plurality of scanning lines and signal lines crossing to each other, a display pixel provided in a region surrounded by the adjacent scanning lines and adjacent signal lines, a switching element corresponding to said display pixel, said switching element receiving a scanning signal from said scanning lines and an input signal from said signal line, an interlayer insulating film covering said lines and said switching element, and a pixel electrode provided on said interlayer insulating film corresponding to said display pixel; a counter substrate having a counter electrode opposite to said pixel electrode and adhered to said active matrix substrate by a sealing material at the prescribed gap; and a liquid crystal layer disposed in a space defined by said active matrix substrate, said counter substrate electrode and said sealing material. An adhesion reinforcing portion is provided in at least a part of said interlayer insulating film contacting said sealing material.

In one embodiment of the invention, said switching element is a thin film transistor, and wherein said active matrix substrate has a gate insulating film formed on the gate electrode of said thin film transistor, and a part of said adhesion reinforcing portion is provided in said gate insulating film and the outside of the display region.

In another embodiment of the invention, said display region is a rectangular shape, and said adhesion reinforcing portion is provided in the corner portions of said interlayer insulating film.

In still another embodiment of the invention, said adhesion reinforcing portion is a space defined by removing the corner portions of said interlayer insulating film, or a hole penetrating said interlayer insulating film.

According to still another aspect of the invention, the liquid crystal display device includes: an active matrix substrate having a plurality of scanning lines and signal lines crossing to each other, a switching element provided in a matrix shape, said switching element receiving a scanning signal from said scanning lines and an input signal from said signal line, and a pixel electrode provided corresponding to said switching element; a color filter substrate having color filter layers and a black matrix and adhered to said active matrix substrate by a sealing material at the prescribed gap; and a liquid crystal layer disposed between said active matrix substrate and said color filter substrate. An interlayer insulating film is provided between said lines and said pixel electrode and in a region including a region having said sealing material disposed.

In one embodiment of the invention, an outflow preventing portion is provided in said interlayer insulating film under said sealing material.

In another embodiment of the invention, said outflow preventing portion comprises two or more portions having different thicknesses.

In still another embodiment of the invention, said outflow preventing portion comprises a portion having the same thickness as that of said interlayer insulating film formed in a region corresponding to said pixel electrode, and a portion defined by removing a part of said interlayer insulating film.

In still another embodiment of the invention, said outflow preventing portion comprises three or more portions having different thicknesses, and said three or more portions having different thicknesses include a portion having the same thickness as that of said interlayer insulating film formed in a region corresponding to said pixel electrode, and a portion defined by removing a part of said interlayer insulating film.

In still another embodiment of the invention, said black matrix is made from a resin.

In still another embodiment of the invention, a level between said color filter layer and said black matrix layer is constant.

In still another embodiment of the invention, a transparent conductive film constituting said pixel electrode is provided on said outflow preventing portion.

In still another embodiment of the invention, said transparent conductive film is provided so as to cover the entire portion of said outflow preventing portion.

In still another embodiment of the invention, said transparent conductive film is provided in regions other than a region corresponding to said line formed under said outflow preventing portion.

In still another embodiment of the invention, said transparent conductive film is provided in regions corresponding to said lines formed under said outflow preventing portion, and wherein said transparent conductive film provided in the regions corresponding to said lines is electrically separated from each other.

In still another embodiment of the invention, a convex portion is provided in said outflow preventing portion corresponding to the electrically separated portion of said transparent conductive film.

In still another embodiment of the invention, a portion defined by removing a part of the interlayer insulating film is provided in the outflow preventing portion corresponding to the electrically separated portion of said transparent conductive film.

According to still another aspect of the invention, a process for producing a liquid crystal display device is provided. The method includes the steps of: forming an interlayer insulating film using a photosensitive resin material; and exposing the prescribed portion of said interlayer insulating film with a prescribed exposure amount of light and developing said portion, so as to form an outflow preventing portion.

In one embodiment of the invention, the prescribed portion of said interlayer insulating film is exposed with n classes of the exposure amounts and developed to form said outflow preventing portion having n types of different thicknesses.

Thus, the invention described herein makes possible the advantages of: (1) providing a liquid crystal display device having excellent mechanical strength as well as sealing property without any poor display caused by the sealing material; and (2) providing a convenient process for producing such a liquid crystal display device.

These and other advantages of the present invention will become apparent to those skilled in the art upon reading and understanding the following detailed description with reference to the accompanying figures.

BRIEF DESCRIPTION OF THE DRAWINGS

FIG. 18 is an enlarged plan view of the XVIII portion of FIG. 15.

FIG. 19 is a cross-sectional view taken along with the XIX—XIX line of FIG. 18.

FIG. 20 is a cross-sectional view taken along with the XX—XX line of FIG. 18.

DESCRIPTION OF THE PREFERRED EMBODIMENTS

The following specifically illustrates the preferred embodiments of the present invention with reference to the drawings, but the present invention is not limited to these embodiments.

Embodiment 1

Figure 1:
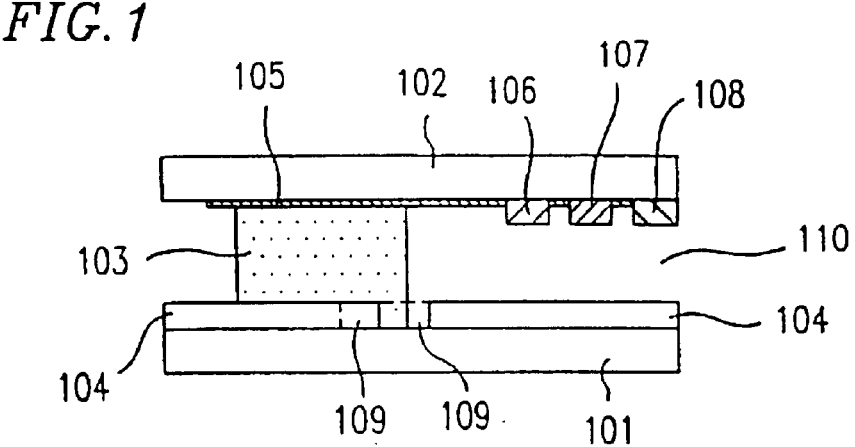
FIG. 1 is a schematic cross-sectional view showing the vicinity of the sealing material of a liquid crystal display device according to a preferred embodiment of the present invention.
Figure 2:
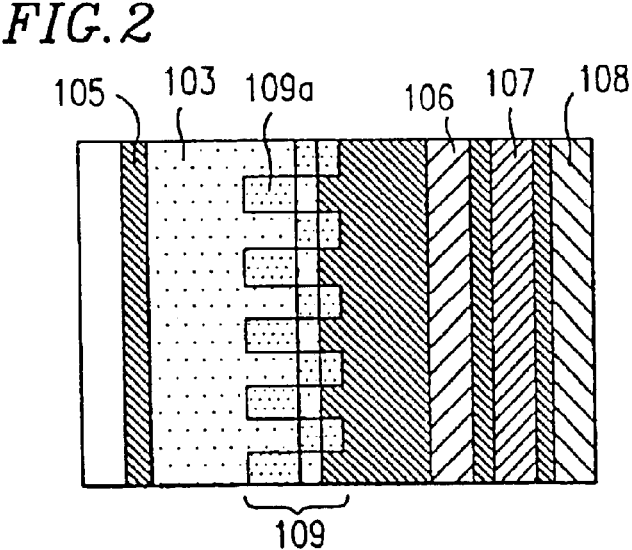
FIG. 2 is a schematic plan view of the liquid crystal display device of FIG. 1.
Figure 3:
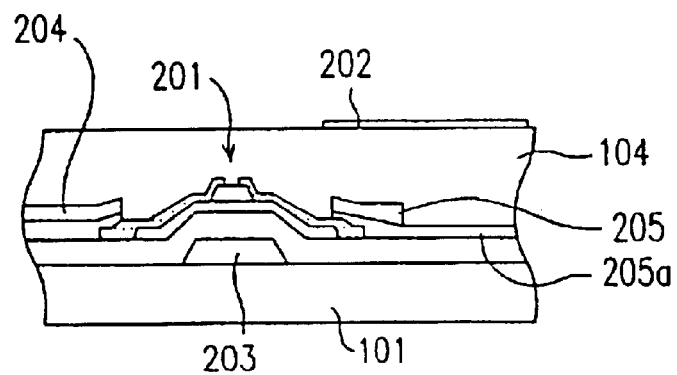
FIG. 3 is a schematic cross-sectional view showing the TFT portion of a liquid crystal display device according to a preferred-embodiment of the present invention.

FIG. 1 is a schematic cross-sectional view showing the vicinity of the sealing material of a liquid crystal display device according to a preferred embodiment of the present invention, and FIG. 2 is a schematic plan view of the liquid crystal display device. FIG. 3 is a schematic cross-sectional view showing the TFT portion of the liquid crystal display device.

The liquid crystal display device comprises a TFT substrate 101 and a color filter substrate 102 both of which are opposite to each other, and a sealing material 103 formed in the periphery portion between the substrates 101 and 102. Preferably, the sealing material 103 is continuously formed on the four sides of the periphery portion. A liquid crystal layer 110 is interposed between the substrates 101 and 102 and is sealed by the sealing material 103. The liquid crystal layer may contain any suitable liquid crystal material. The substrates 101 and 102 are disposed at the prescribed cell gap by using an intra-sealing spacer and a liquid crystal layer spacer (both not shown in FIGS. 1 to 3, but described later). A liquid crystal inlet which is closed after the injection of the liquid crystal material constituting the liquid crystal layer 110 is formed in the sealing material 103.

An interlayer insulating film 104 is formed on the entire surface of the color filter 102 side of the TFT substrate 101. The interlayer insulating film 104 is extended to the outside of the sealing material 103. A pixel electrode 202 which is a transparent conductive film is formed on the interlayer insulating film 104 in a matrix shape, as illustrated in FIG. 3, and a region on which the pixel electrode 202 is formed constitutes a display portion. The above-described sealing material 103 is formed on the periphery portion of the substrates as surrounding the display portion. Under the interlayer insulating film 104, any suitable TFT 201 is formed in a matrix shape, and a scanning line 203 and a signal line 204 for transmitting a gate signal and a source signal (a display signal), respectively, to the TFT 201 are also formed. The scanning line 203 and the signal line 204 are formed as crossing at a right angle to each other. A part of the scanning line 203 constitutes a gate electrode of the TFT 201, while a part of the signal line 204 constitutes its source electrode. One terminal of a connecting piece 205a is electrically connected to a drain electrode 205 of the TFT 201, while the other terminal of the connecting piece 205a is electrically connected to the pixel electrode 202 through a contact hole (not shown) formed as penetrating the interlayer insulating film 104.

An outflow preventing portion 109 is further formed on the interlayer insulating film 104 as overlapping the edge of the sealing material 103. The outflow preventing portion 109 has concave portions 109a alternatively arranged on both sides of one straight line. The adjacent concave portions arranged on both sides of the straight line are at least contacted or overlapped with each other, and the concave portions arranged on the same side of the straight line are separated from each other by a flat portion. The outflow preventing portion 109 is, for example, in a checkered pattern, as illustrated in FIG. 2. A pitch of the outflow preventing portion (an interval between the adjacent rectangles arranged on the same side) corresponds to, for example, a pixel pitch. In this embodiment, the pitch of the concave portions of the outflow preventing portion is preferably 100 μm or less. The depth of each concave portion 109a is preferably 5000 Å or more (the upper limit of the depth may be the film thickness of the interlayer insulating film). The shape of each concave portion of the outflow preventing portion viewed from the normal line direction of the substrate may be, for example, rectangle, square, or a polygon (for example, trapezoid, pentagon, hexagon). The outflow preventing portion 109 is formed on the liquid crystal layer 110 side from the center of the width of the sealing material 103.

On the color filter substrate 102, a color filter having red (R), green (G) and blue (B) color layers 106, 107 and 108 divided by a black matrix 105 is formed. The color layers 106, 107 and 108 are formed using an acrylic resin or gelatin on a region corresponding to the pixel electrode 202 of the above-described display portion. The black matrix 105 is formed using a metal such as Cr or CrO, or the like, as its outside end portion extending to the outside of the sealing material 103.

The following illustrates one preferred example of a process for producing the liquid crystal display device of this embodiment with reference to FIGS. 3 and 4A to 4C.

Figure 4A:
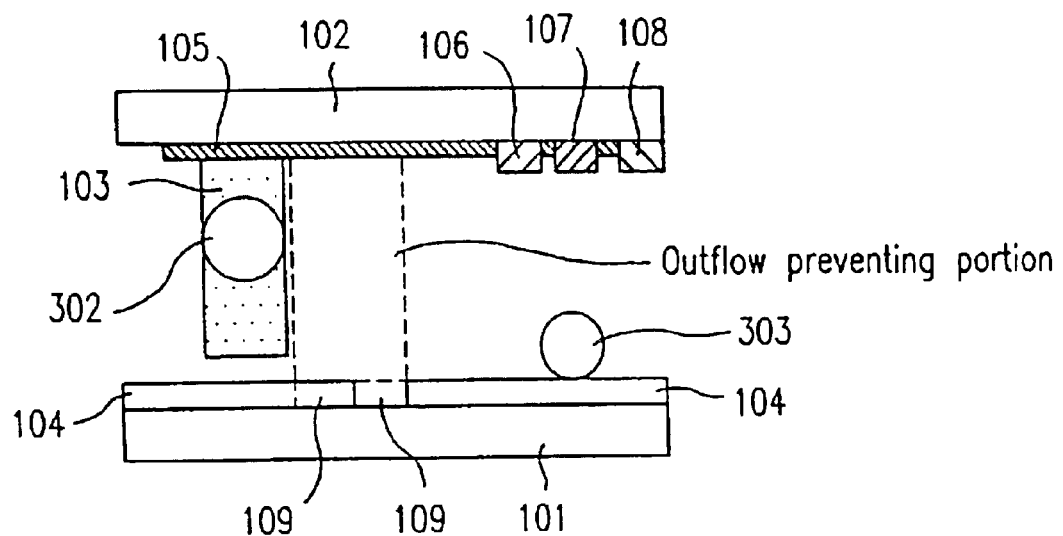
FIGS. 4A to 4C are schematic cross-sectional views showing a process for producing a liquid crystal display device according to a preferred embodiment of the present invention.

First, as illustrated in FIG. 4A, a color filter (a color filter layer) having the R, G and B color filters 106, 107 and 108 divided by the black matrix 105 is formed on the color filter substrate 102. Then, the sealing material 103 is formed on the black matrix 105 by any suitable method (for example, coating). The sealing material 103 comprises an intra-sealing spacer 302 (for example, a glass fiber having a diameter of 5.5 cm). The width of the sealing material 103 at the time of its formation is, for example, about 300 μm. The sealing material 103 is designed as not overlapping with the outflow preventing portion 109 at the time of its formation on the substrate 102, as illustrated in FIG. 4A.

Then, as illustrated in FIG. 3, the TFT 201, the scanning line 203, the signal line 204 and the connecting piece 205a are formed on the TFT substrate 101 using any suitable materials by any suitable methods. Subsequently, the interlayer insulating film 104 is formed thereon by coating for example a photosensitive acrylic resin with a film thickness of 3 μm by a spin coating method. Then, a contact hole is formed in the interlayer insulating film 104 by any suitable method (for example, etching), and the outflow preventing portion 109 is formed in the prescribed pattern (for example, a checkered pattern having a pixel pitch). Then, a transparent conductive film is formed by a sputtering method, and thereafter the transparent conductive film is patterned by any suitable method to form the pixel electrode 202. The pixel electrode 202 is electrically connected to the drain electrode 205 of the TFT 201 through the contact hole (not shown) and the connecting piece 205a.

According to this structure (i.e., having the interlayer insulating film formed), it is possible to form the pixel electrode 202 as overlapping with the scanning line 203 and the signal line 204. Therefore, because it is possible to greatly enlarge an aperture portion which contributes to the display (i.e., a portion applying an electric field on the liquid crystal layer), a very bright liquid crystal display device can be obtained. Also, since the interlayer insulating film 104 is formed by, for example, a spin coating method, the lower portion of the sealing material 103 is substantially flattened. Additionally, either the TFT substrate 101 or the color filter substrate 102 may be fabricated first.

Figure 4B:
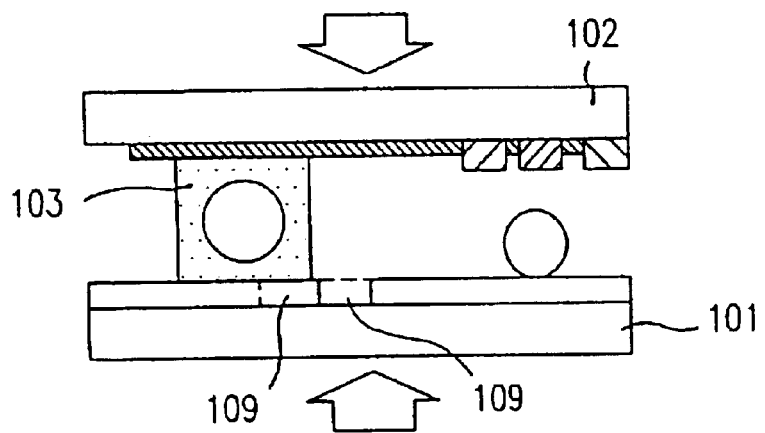

Then, the liquid crystal layer spacer 303 (for example, a plastic spacer having a diameter of 4.5 μm) is spinkled on the TFT substrate 101, and as illustrated in FIG. 4B, the TFT substrate 101 and the color filter substrate 102 are adhered together, and pressed with a load until the prescribed cell gap is obtained. The load, a period until the load reaches the prescribed level (a load imposing rate), and a pressing period (a maintaining period with the prescribed load) may be varied depending upon the applications of the intended liquid crystal display device and the size of the cell gap, but the load is preferably 1000 to 1200 kgf, the load imposing rate is preferably 5 to 15 seconds, and the pressing period is 60 minutes or more in this embodiment.

Figure 4C:
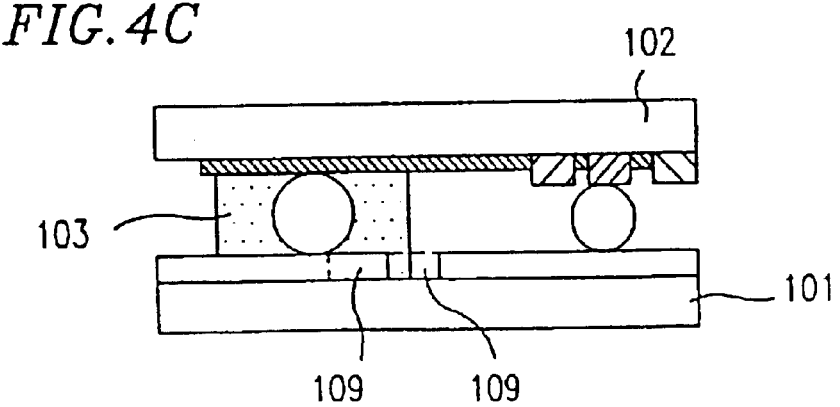
Figure 5:
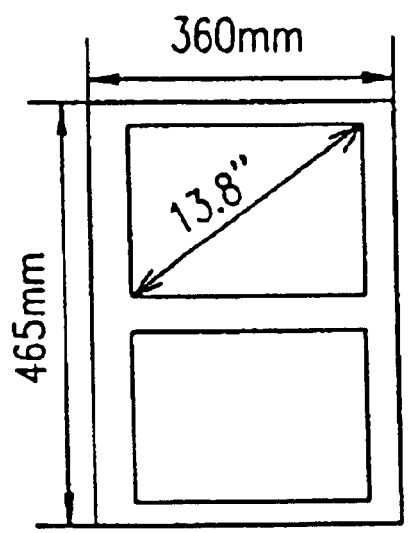
FIG. 5 is a schematic view illustrating a display screen size (13.8") of a liquid crystal display device used for a test demonstrating the effects of the present invention.
Figure 6:
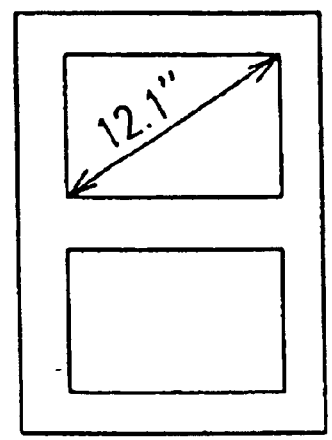
FIG. 6 is a schematic view illustrating a display screen size (12.1") of a liquid crystal display device used for a test demonstrating the effects of the present invention.

The sealing material 103 is deformed into a compressed shape by the pressing. As illustrated in FIG. 4C, the width of the sealing material 103 at the time of the completion of the curing procedure is, for example, about 1000 μm. Also, the edge portion of the sealing material 103 is overlapped with the outflow preventing portion 109, and as illustrated in FIG. 2, the outflow preventing portion 109 is located on the liquid crystal layer 110 side from the center of the width of the sealing material 103. Moreover, the outflow preventing portion 109 does not reach the liquid crystal layer 110. As mentioned above, the width of the sealing material 103 at the time of its formation is, for example, about 300 μm, and the sealing material 103 is designed as not overlapping with the outflow presenting portion 109. This is to prevent the bubbles present in the outflow preventing portion 109 from remaining inside the sealing material 103 by deforming the sealing material into the prescribed sealing width while pushing out the bubbles present in the outflow preventing portion 109 during the course of the deformation of the sealing material.

Then, any suitable liquid crystal material is injected between the adhered substrates by any suitable method to form a liquid crystal layer. As described above, the liquid crystal display device of this embodiment is fabricated.

The liquid crystal display device of this embodiment and the conventional liquid crystal display device were actually fabricated, and their display characteristics were evaluated. The following illustrates the results.

Four types of the liquid crystal display devices of this embodiment (those comprising an interlayer insulating film having an outflow preventing portion provided with concave portions having a depth of 3 μm) having different display screen sizes as illustrated in FIGS. 5 to 8 were fabricated using a glass substrate (No. 7059 manufactured by Corning, Corp.) having a size of 465 mm×360 mm and a thickness of 1.1 mm. Also, another four types of the liquid crystal display devices of this embodiment were fabricated by the same procedure except that the depth of the concave portion is set 5000 Å. On the other hand, four types of the conventional liquid crystal display devices (comparative examples) having different display screen sizes as illustrated in FIGS. 5 to 8 were fabricated by the same procedure as that for the liquid crystal display devices of this embodiment except that the outflow preventing portion is not formed in the interlayer insulating film. A thermosetting resin (XN-21S manufactured by Mitsui Toatsu Kagaku, Corp.) was used as the sealing material for all of the liquid crystal display devices fabricated.

Specific fabrication conditions (the adhering conditions of the substrates) for all of the liquid crystal display devices thus fabricated were as follows: (A) a load imposing rate, 10 second; (B) a pressing load, two levels of 1000 kgf and 1200 kgf; (C) a curing temperature, 170° C.; and (D) a heating rate until reaching the curing temperature, two levels of 10° C./minute and 5° C./minute. However, the load imposing rate, the pressing load and the heating rate until reaching the curing temperature were 10 seconds, 1000 kgf and 5° C./minute, respectively, for the liquid crystal display devices having a concave portion depth of 5000 Å in the outflow preventing portion.

They were evaluated based on whether the resin component of the sealing material was separated and flowed out or not, and whether the resin component of the sealing material reaches the display portion (2 mm apart from the edge portion of the sealing material) or not. The results of the evaluation are illustrated in Table 1.

TABLE 1

| | Sample | | Pressing load Heating rate | 1000 kg | | 1200 kg | The depth of concave portion |
|---|---|---|---|---|---|---|---|
| | | | | 5° C./min | 10° C./min | 10° C./min | 5000 Å |
| Embodiment 1 | With concave portion (The depth of 3 μm) | 12.1" | | ○ | ○ | ○ | ○ |
| | | 13.8" | | ○ | ○ | ○ | ○ |
| | | 10.4" | | ○ | ○ | ○ | Δ |
| | | 6.4" | | ○ | ○ | ○ | Δ |
| Conventional | Without concave portion | 12.1" | | Δ | X | X | — |
| | | 13.8" | | Δ | X | X | — |
| | | 10.4" | | Δ | Δ | X | — |
| | | 6.4" | | ○ | Δ | Δ | — |

In Table 1, ○ indicates that the device provides a good display (the resin component of the sealing material neither flows out nor reaches the display portion); Δ indicates that the device provides a slightly poor display (the resin component of the sealing material flows out, but does not reach the display portion); and × indicates that the device provides a poor display (the resin component of the sealing material flows out and reach the display portion).

As can be seen from Table 1, none of the conditions according to this embodiment provides a poor display. Although a separation of the resin component is observed in two types of the liquid crystal display devices having a concave depth of 5000 Å in the outflow preventing portion and having a smaller display screen size, they do not provide any poor display. Therefore, it is preferred that the concave depth of the outflow preventing portion be 5000 Å or more in the present invention.

Also, the display characteristics were evaluated by varying the shape (viewed from the normal line direction of the substrate) of the concave portion of the outflow preventing portion. The following illustrates the results.

Figure 9:
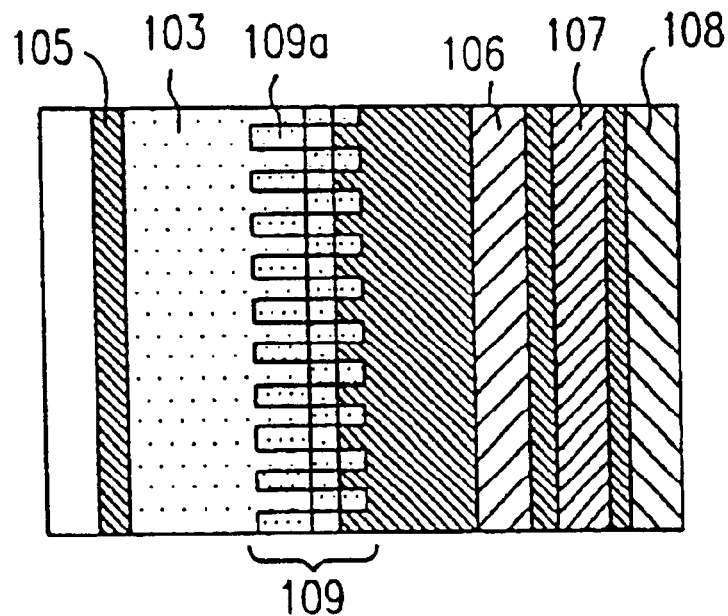
FIG. 9 is a schematic plan view showing the vicinity of the sealing material of a liquid crystal display device used for evaluating the shape of the concave portion of an outflow preventing portion formed on the liquid crystal display device of the present invention.
Figure 10:
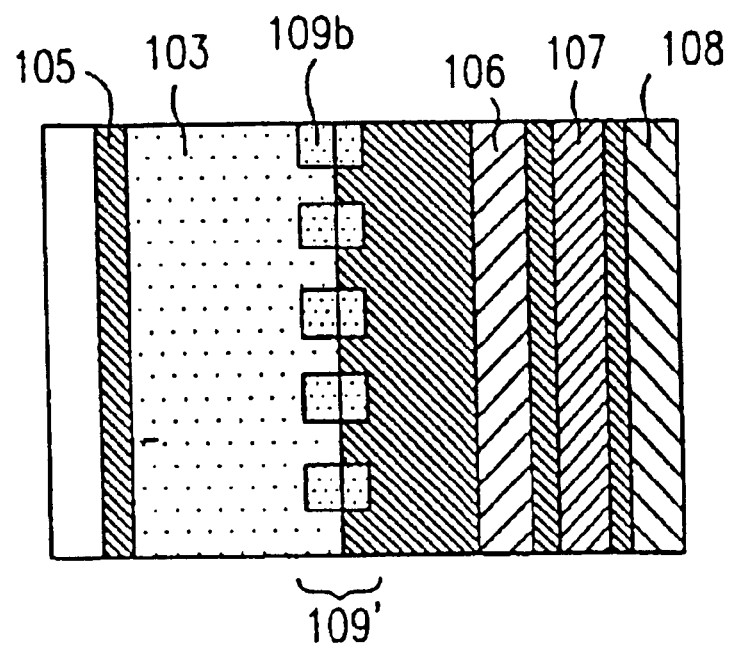
FIG. 10 is a schematic plan view showing the vicinity of the sealing material of another liquid crystal display device used for evaluating the shape of the concave portion of an outflow preventing portion formed on the liquid crystal display device of the present invention.
Figure 11:
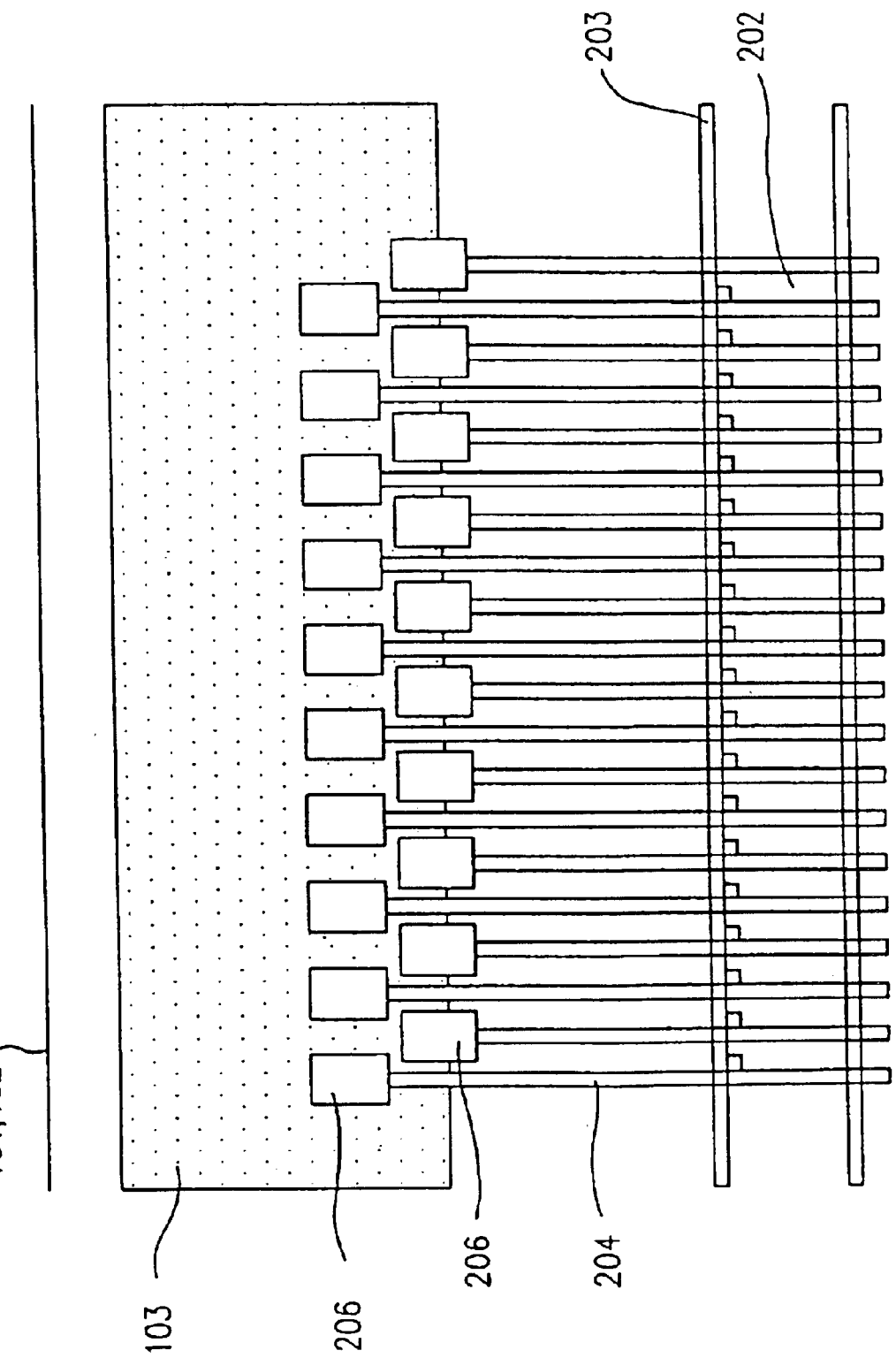
FIG. 11 is a schematic plan view illustrating a case where a contact hole of the wire breakage inspection pad for the signal line is also used for an outflow preventing portion according to a preferred embodiment of the present invention.

A liquid crystal display device having a display screen size of 12.1 inches was fabricated by the same procedure as described above except that the outflow preventing portion was formed as shown in FIG. 9. Also, a liquid crystal display device having a display screen size of 12.1 inches was fabricated by the same procedure as described above except that the outflow preventing portion was formed as shown in FIG. 10. Other test conditions were the same as those described above. The outflow preventing portion illustrated in FIG. 9 has concave portions 109a having a pitch half of that of FIG. 2 and arranged in a checkered shape, and the outflow preventing portion 109' illustrated in FIG. 10 has island-like concave portions arranged in a row.

The display characteristic of each liquid crystal display device was evaluated based on the same criteria as described above. The results of the evaluation are illustrated in Table 2.

TABLE 2

| Sample | Pressing load | 1000 kg | | 1200 kg | The depth of concave portion |
|---|---|---|---|---|---|
| (12.1") | Heating rate | 5° C./min | 10° C./min | 10° C./min | 5000 Å |
| With concave portion (The depth of 3 µm) | Half pitch concave portion | ○ | ○ | ○ | ○ |
| | Island-like concave portion | ○ | Δ | Δ | Δ |

As can be seen from Table 2, the display characteristic of the liquid crystal display device comprising an outflow preventing portion with checker-shaped concave portions having a half pitch is good, while the display characteristic of the liquid crystal display device comprising an outflow preventing portion with island-like concave portions arranged in a row is slightly poor (i.e., the resin component flows out from a portion on which the concave portions are not formed).

Therefore, it is preferred in the present invention that the outflow preventing portion 109 formed on the interlayer insulating film have concave portions 109a alternatively arranged on both sides of one straight line, the adjacent concave portions arranged on both sides of the straight line be at least contacted or overlapped with each other, and the concave portions arranged on the same side of the straight line be separated from each other by a flat portion (for example, in a checkered shape). In other words, it is preferred that the adjacent concave portions be not completely separated from each other. The formation of the outflow preventing portion allows the resin component separated from the sealing material to be collected in the concave portions, and thus prevents it from randomly flowing out. Also, as described above, the shape of the concave portion may be, for example, square, or a polygon (for example, trapezoid, pentagon, hexagon) in addition to a rectangle. This will be applied to other embodiments.

This embodiment also includes a case where a contact hole of an inspection pad 206 for the breakage of the signal line 204 and the scanning line 203 is formed under the lower portion of the sealing material 103, and used as the outflow preventing portion. In this case, it is preferred that the ratio of the areas of the concave portions 109 to a part of the interlayer insulating film 104 on which the sealing material 103 is formed (See, FIGS. 1 and 2 for both) be as equal as possible in four sides of the substrates in order to provide a uniform cell gap in four sides of the substrates. Thus, an inspection pad-shaped concave portion (an outflow preventing portion) may be formed on a side on which the inspection pad 206 is not formed.

Although the outflow preventing portion is formed on the liquid crystal layer side of the sealing material 103 in this embodiment, it may be formed on the outside of the sealing material. In this case, it is also possible to prevent the resin component of the sealing material from flowing out in the same manner. The outside of the sealing material 103 provides an increased cell gap due to an difference in level between the color filter substrate 102 and the black matrix 105, as illustrated in FIG. 1. Therefore, the resin component of the sealing material does not usually flow out into the display portion located inside of the sealing material, and thus no poor display caused by the sealing material occurs.

Embodiment 2

Figure 12:
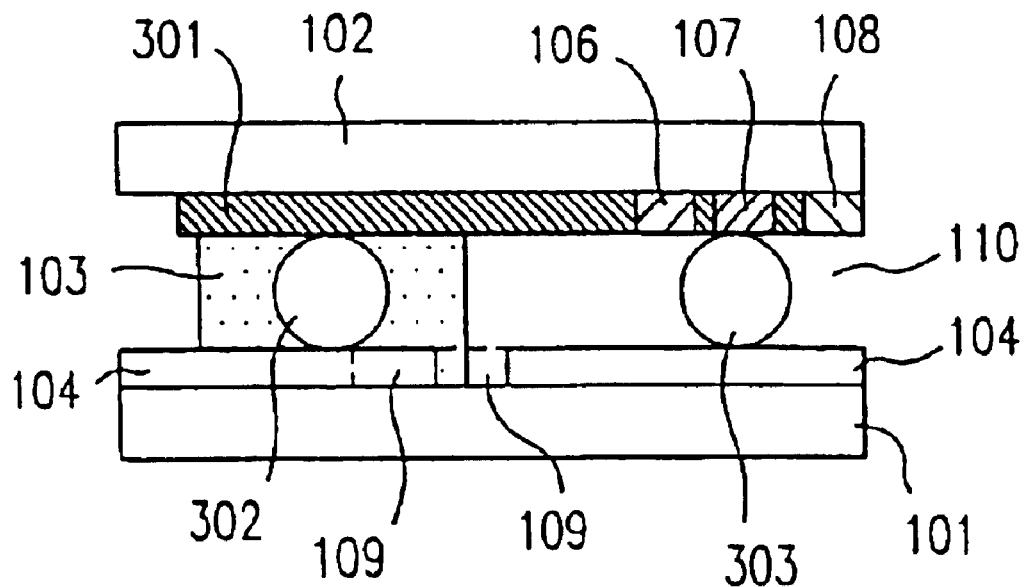
FIG. 12 is a schematic cross-sectional view showing the vicinity of the sealing material of a liquid crystal display device according to another embodiment of the present invention.

This embodiment provides a case where a black matrix 301 of the color filter substrate 102 is made from the same resin material as that of the color layers 106, 107 and 108, as illustrated in FIG. 12. The outflow preventing portion 109 is formed in the interlayer insulating film 104 of the TFT substrate 101 as with Embodiment 1.

Figure 36:
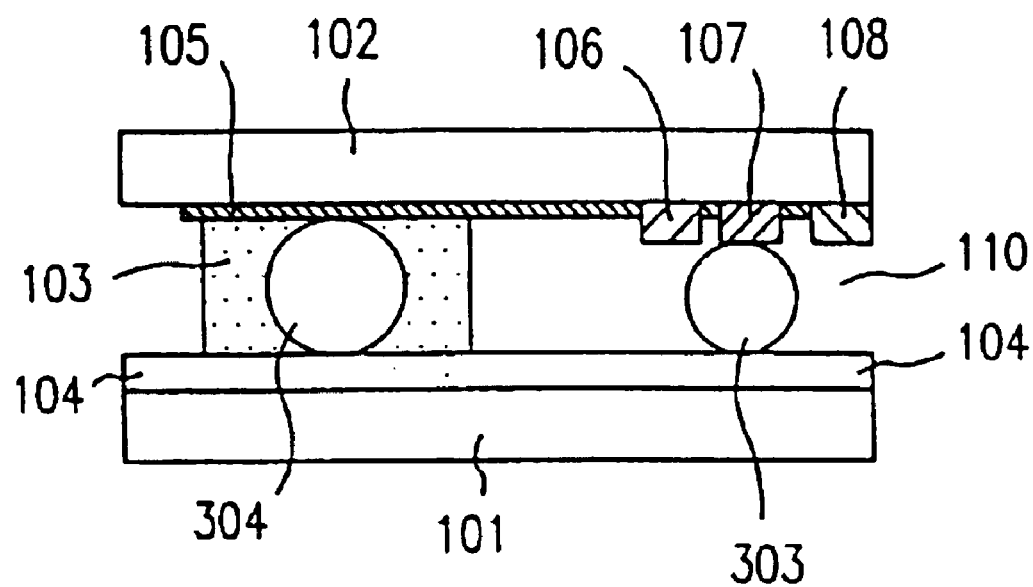
FIG. 36 is a cross-sectional view showing the vicinity of the sealing material of the conventional liquid crystal display device.
Figure 37:
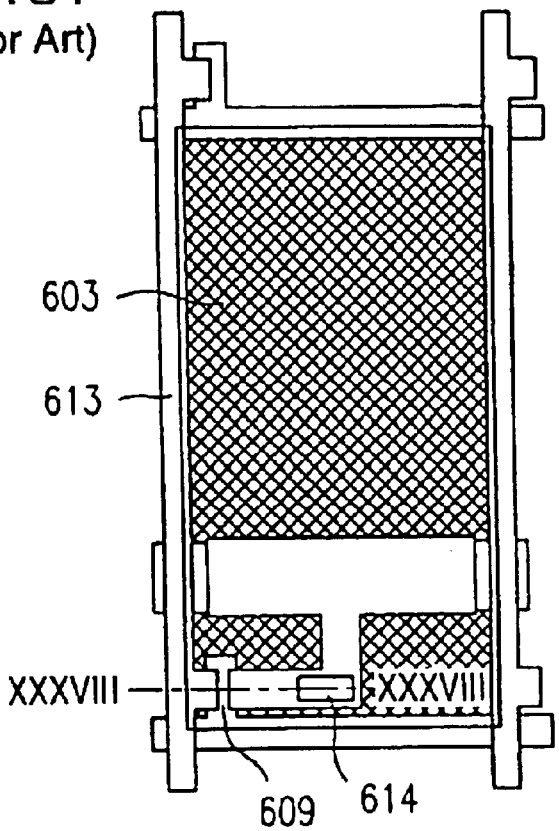
FIG. 37 is a schematic plan view of the conventional active matrix substrate.
Figure 38:
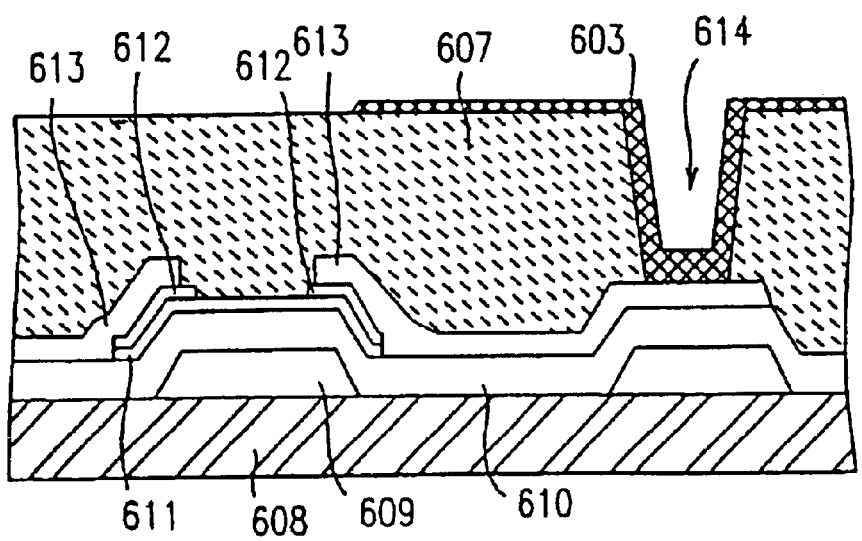
FIG. 38 is a schematic cross-sectional view taken along with the A-A' line of the active matrix substrate of FIG. 37.
Figure 39:
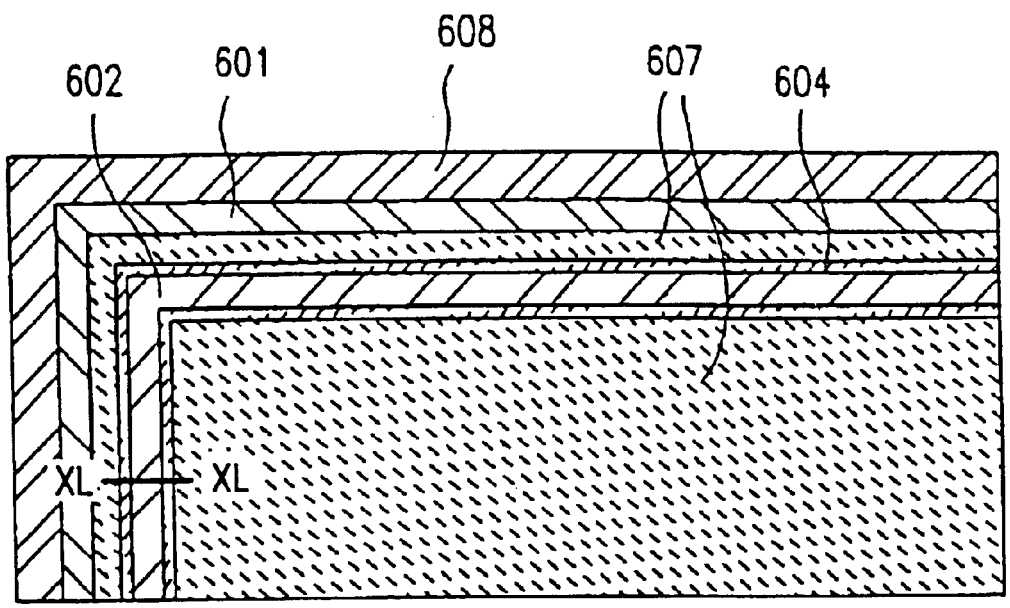
FIG. 39 is a schematic plan view of the conventional active matrix substrate.
Figure 40:
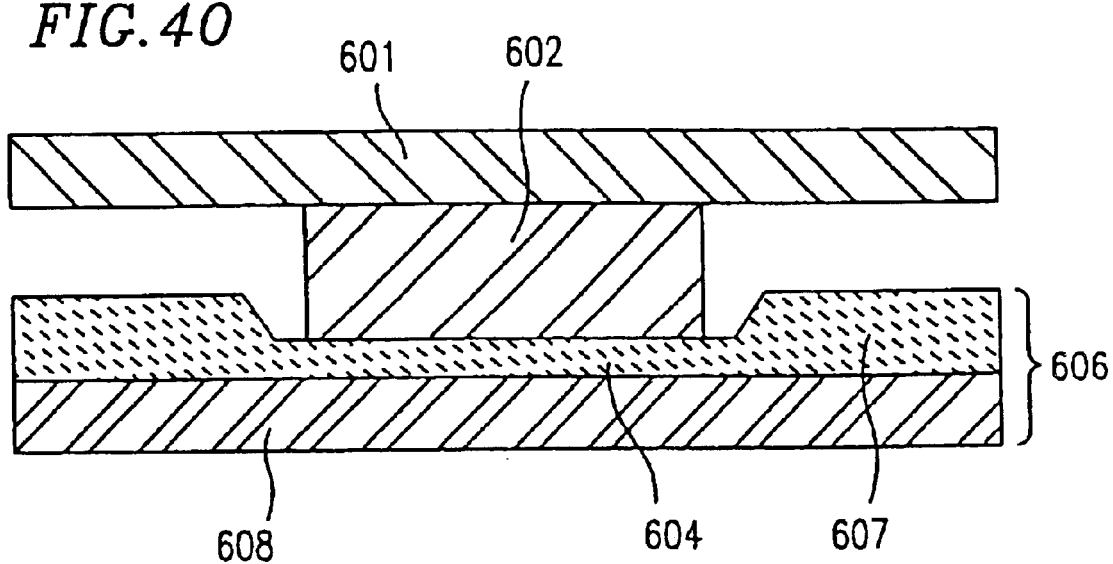
FIG. 40 is a schematic cross-sectional view taken along with the B-B' line of the active matrix substrate of FIG. 39.

In this case, since the black matrix is formed from a resin material, it is possible to increase the thickness of the black matrix 301. For example, the thickness of the black matrix is about 15000 angstroms in this embodiment. Therefore, it is possible to flatten the surface of the color filter. When a black matrix made from a resin material is used, the cell gap of the liquid crystal layer portion will be substantially equal to that of the sealing portion, unlike a case of using a black matrix made from a metal (for example, Cr). Thus, a difference in level between the black matrix 105 made from Cr (i.e., not made from a resin) and the color layers 106, 107 and 108, which is observed in the conventional liquid crystal display device shown in FIG. 36, is eliminated to provide a benefit that the outflow of the resin component of the sealing material into the color layers can be prevented.

Figure 13:
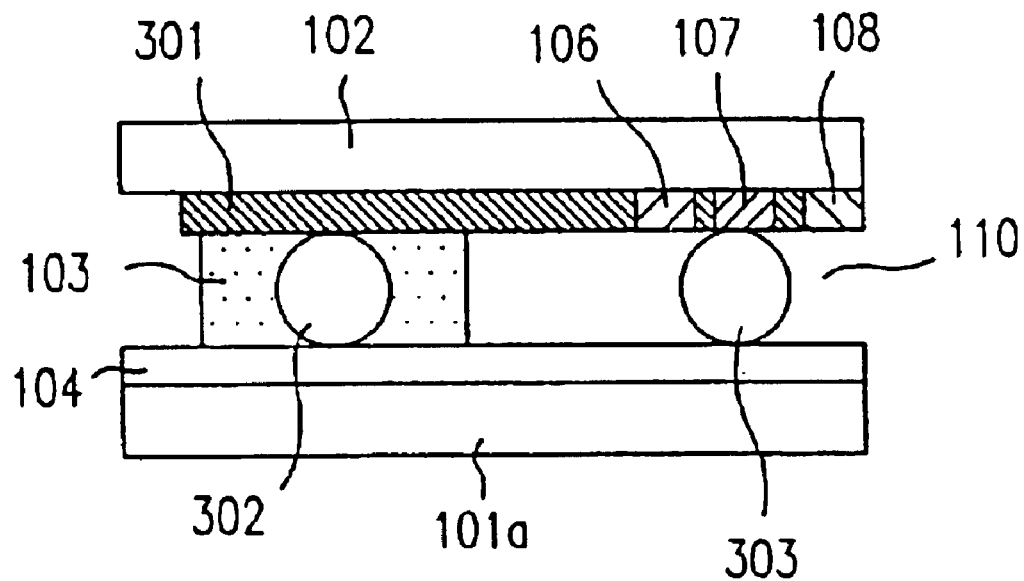
FIG. 13 is a schematic cross-sectional view showing the vicinity of the sealing material of a liquid crystal display device used for comparing with the liquid crystal display device of FIG. 12.

The following illustrates a comparison in display characteristics between the liquid crystal display device of this embodiment shown in FIG. 12 and the conventional liquid crystal display device shown in FIG. 13. The conventional liquid crystal display device shown in FIG. 13 is fabricated by adhering a color filter substrate 102 to a TFT substrate 101a comprising an interlayer insulating film having no outflow preventing portion. Two types (display screen sizes of 12.1 inches and 6.4 inches) of each of the liquid crystal display devices of this embodiment and the conventional liquid crystal display devices were fabricated. Also, the cell gap of each of these four liquid crystal display devices was varied from 4 µm to 6 µm. The fabrication conditions (the adhering conditions of the substrates) were a press load of 1200 kgf, a curing temperature of 170° C., and a heating rate until reaching the curing temperature of 10° C./minute.

The display characteristic of each liquid crystal display device was evaluated based on the same criteria as described above. The results of the evaluation are illustrated in Table 3.

TABLE 3

| Sample | | | Cell gap | | | | |
|---|---|---|---|---|---|---|---|
| | | | 4 µm | 4.5 µm | 5 µm | 5.5 µm | 6 µm |
| Conventional | Without concave portion | 12.1" | X | X | X | Δ | ○ |
| | | 6.4" | X | X | Δ | ○ | ○ |
| Embodiment 2 | With concave portion (The depth of 3 µm) | 12.1" | ○ | ○ | ○ | ○ | ○ |
| | | 6.4" | ○ | ○ | ○ | ○ | ○ |

As can be seen from Table 3, the conventional liquid crystal display device provides a very poor display, when the cell gap is small (5 µm or less).

Therefore, it is theoretically preferred that the cell gap of the liquid crystal layer be 5.5 µm for all the liquid crystal display devices to be fabricated, but it is practically very difficult to change the cell gap in a case where the cell gap is already determined by a birefringence ratio Δn of the liquid crystal material so that it provides a relationship of d<5.5 µm. The birefringence ratio Δn of the liquid crystal material in the liquid crystal layer must be varied so as to change the cell gap. The variation of Δn may change the reliability, electro-optical characteristics and the like of the liquid crystal display device.

Thus, when the cell gap is reduced in the conventional liquid crystal display device, a poor display caused by the sealing material occurs. On the other hand, according to this embodiment, even when the cell gap is reduced to 4 µm, no poor display caused by the outflow of the resin component of the sealing material is observed by the formation of the outflow preventing portion 109 on the TFT substrate 101, as illustrated in FIG. 12. Therefore, this embodiment is especially useful for the improvement of the poor display of a liquid crystal display device having an already determined Δn value based on a relationship of d<5.5 µm.

Also, the same effect was observed, when the same outflow preventing portion was formed on the color filter substrate. Accordingly, the outflow preventing portion may be formed on at least one of the TFT substrate and the color filter substrate in the present invention.

Although a liquid crystal display device comprising a liquid crystal layer as a display medium between a pair of substrates is illustrated above for simplicity, the present invention is applicable to any liquid crystal display devices comprising substrates adhered together by a sealing material. For example, the present invention can be applied to a liquid crystal display device comprising a liquid crystal region and a polymer region surrounding said liquid crystal region between a pair of substrates.

Embodiment 3

Figure 14:
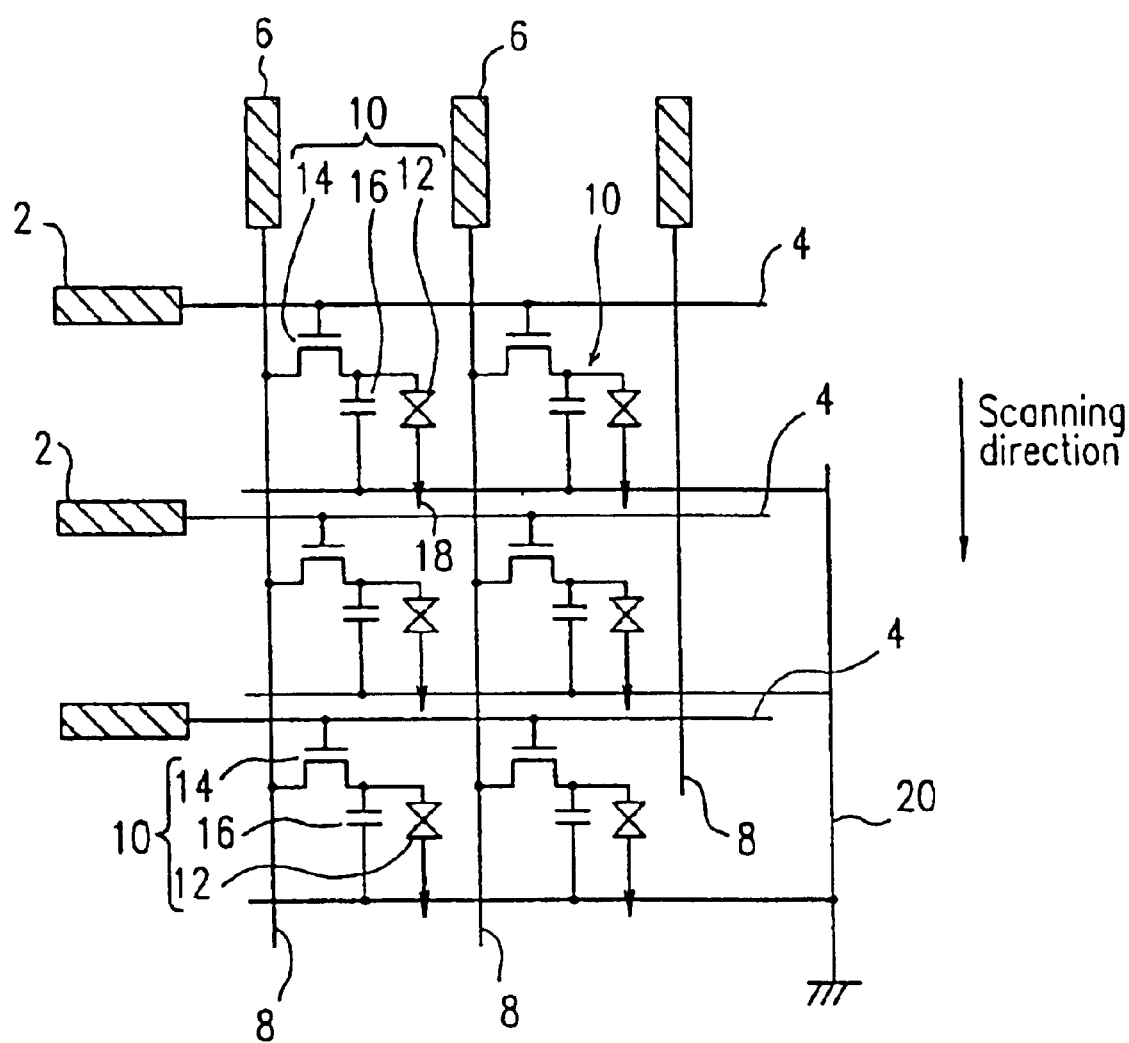
FIG. 14 is a circuit structural view of a liquid crystal display device according to still another embodiment of the present invention.

The following illustrates an active matrix-type liquid crystal display device which is still another embodiment of the present invention. First, the circuit of the active matrix-type liquid crystal display device is illustrated with reference to FIG. 14. Gate bus lines 4 which are scanning lines are connected to a plurality of scanning terminals 2 located in the linear direction, while source bus lines 8 which are signal lines are connected to a plurality of signal terminals 6 located in the row direction. Each of the gate bus lines 4 and each of the source bus lines 8 cross each other (substantially at a right angle in this embodiment). A display pixel 10 is formed in a region surrounded by the adjacent gate bus lines and the adjacent source bus lines. The display pixel 10 comprises a pixel electrode 12, a switching element (an active element) 14 such as TFT, and a storage capacitor 16.

The pixel electrode 12 is opposite to a counter electrode 18. The storage capacitor 16 is commonly connected to a storage capacitor bus line 20. A gate signal is scanned on each gate bus line 4 in a direction indicated by an arrow in the figure, and applied to a gate electrode of each switching element 14, thereby applying a signal from each source bus line 8 to the pixel electrode 12 through the source electrode and drain electrode of the switching element 14. A liquid crystal layer which is a display medium is disposed between the pixel electrode 12 and the counter electrode 18, and an orientation of the liquid crystal molecules is varied depending upon the applied voltage to change the optical properties of the liquid crystal layer. A display is performed using the variation of the optical properties of the liquid crystal layer.

Figure 15:
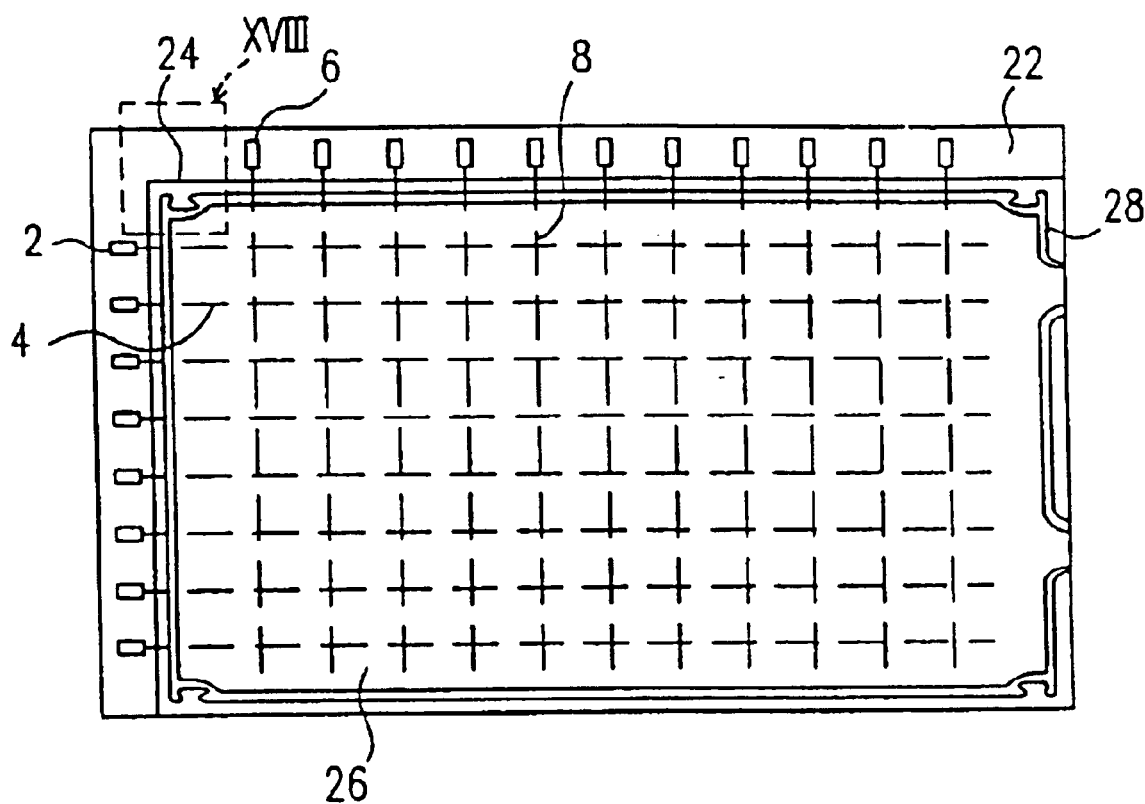
FIG. 15 is a schematic plan view of the whole of the liquid crystal display device of FIG. 14.

The whole plane structure of a liquid crystal display device having such a circuit is illustrated with reference to FIG. 15. The liquid crystal display device comprises a pair of substrates which are oppositely disposed. On one substrate 22 (an active matrix substrate), a scanning terminal 2, a gate bus line 4, a signal terminal 6, a source bus line 8, and a display pixel 10, and the like are formed, while on the other substrate 24 (a counter substrate), a counter electrode 18 and the like are formed. The active matrix substrate 22 and the counter substrate 24 are adhered together at the prescribed gap (a cell gap) by a sealing material 28. The sealing material is formed on the periphery portion of the substrates. A liquid crystal material is injected and sealed into a region surrounded by the sealing material (a display region 26).

Figure 16:
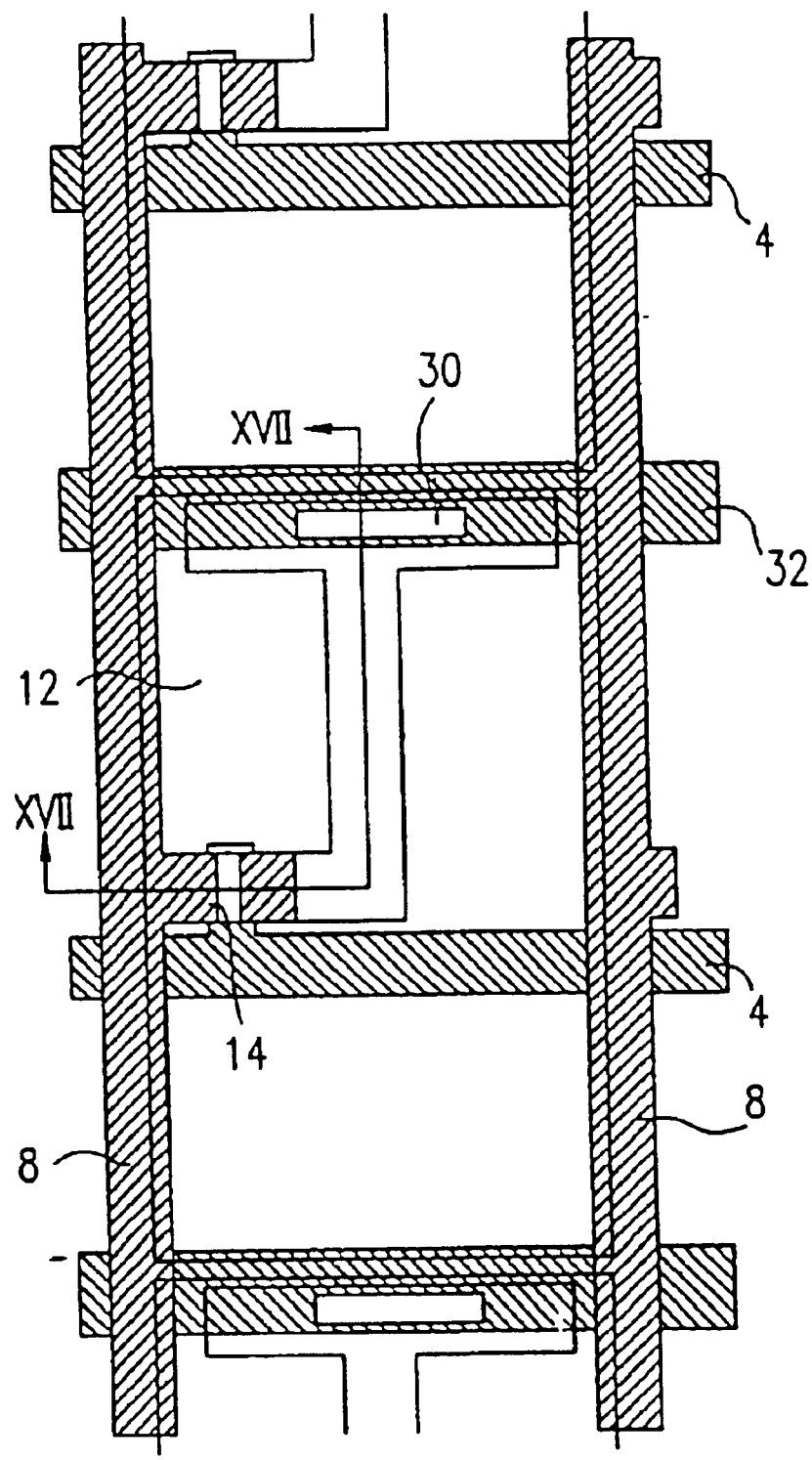
FIG. 16 is a schematic plan view of one pixel portion of the liquid crystal display device of FIG. 14.

Then, one pixel portion of this liquid crystal display device is illustrated with reference to FIG. 16. FIG. 16 is a schematic plan view of one pixel portion of the liquid crystal display device. A pixel electrode 12 is formed in each of the rectangular regions surrounded by the adjacent gate bus lines 4 and source bus lines 8 which are formed on an active matrix substrate 22. A part of the gate bus line 4 and the source bus line 8 is overlapped with the periphery portion of the pixel electrode 12. In the vicinity of a crossing point of the gate bus line 4 and the source bus line 8, a switching element 14 (for example, TFT) which is connected to the pixel electrode 12 is formed. The gate bus line 4 and the source bus line 8 are connected to the gate electrode and the source electrode of the switching element 14, respectively. The drain electrode of the switching element 14 is connected to the pixel electrode 12 through a contact hole 30. A bus line 32 which constitutes a storage capacitor between the switching element 14 and the drain electrode through an insulating film is connected to the counter electrode at the same potential.

Figure 17:
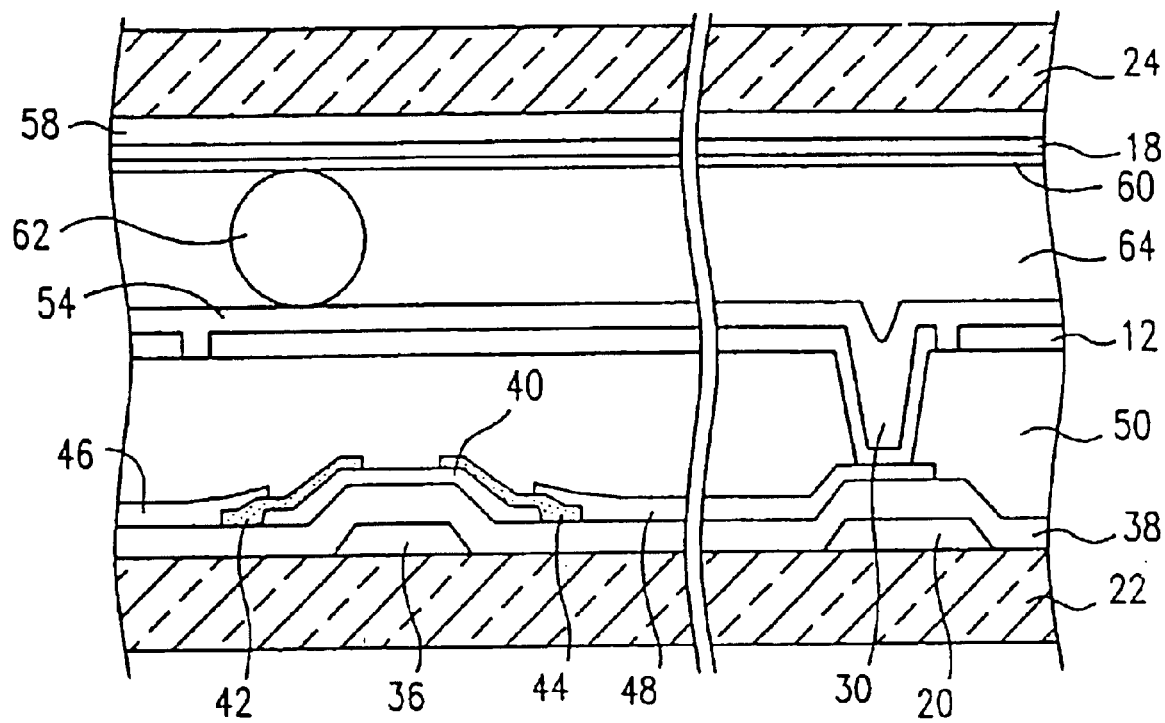
FIG. 17 is a cross-sectional view taken along with the XVII—XVII line of FIG. 16.

Then, the cross-sectional structure of one pixel portion of this liquid crystal display device is illustrated with reference to FIG. 17. FIG. 17 is a cross-sectional view taken along with the XVII—XVII line of FIG. 16. A gate electrode 36 of the switching element 14 is formed on a transparent insulating substrate 22. A gate insulating film 38 is formed on the gate electrode 36. A semiconductor layer 40 is formed and layered on the gate electrode 36. On both edge portions of the semiconductor layer 40, $N^{30}$-Si layers 42 and 44 are formed. While a source electrode 46 of the switching element 14 is formed on one $N^+$-Si layer 42, a drain electrode 48 is formed on the other $N^+$-Si layer 44. An interlayer insulating film 50 is formed as covering the switching element 14, the gate bus line 4 and the source bus line 8. A pixel electrode 12 made from a transparent conductive film is formed on the interlayer insulating film 50. The drain electrode 48 of the switching element 14 is electrically connected to the pixel electrode 12 through a contact hole 30 penetrating the interlayer insulating film 50. An alignment film 54 is formed on the pixel electrode 12.

On the other hand, a color filter layer 58, a counter electrode 18 made from a transparent conductive film, and an alignment film 60 are formed on a transparent insulating substrate 24. The substrates 22 and 24 are adhered together by a sealing material (described below) as maintaining a gap therebetween with a spacer 62.

A liquid crystal layer 64 is disposed between the substrates 22 and 24. A polarizing plate, a lighting equipment, a phase difference plate, and the like which are located on the outer surface of each of the substrates 22 and 24 are not shown in the figure.

Then, the structure of a corner portion of the liquid crystal display device is illustrated with reference to FIGS. 18 to 20. FIG. 18 is an enlarged plan view of the XVIII portion of FIG. 15; FIG. 19 is a cross-sectional view taken along with the XIX—XIX line of FIG. 18; and FIG. 20 is a cross-sectional view taken along with the XX—XX line of FIG. 18. A sealing material 28 is disposed between the substrates 22 and 24, and a liquid crystal material is sealed in a space defined by the substrates 22 and 24 and the sealing material 28. A region in which the liquid crystal material is sealed is a display region 26. An interlayer insulating film 50 on the substrate 22 is formed on the outside of the display region 26, and an adhesion reinforcing portion 50a is formed on its corner portion. The adhesion reinforcing portion 50a is defined by such a space that the sealing material 28 can be directly contacted with the gate insulating film 38 of the substrate 22 and also directly contacted with a light-shading layer (a black matrix) of the color filter layer 58. The adhesion reinforcing portion 50a may be for example a space defined by removing the corner portion of the interlayer insulating film 50, or a hole penetrating the interlayer insulating film. Neither the lines and alignment film formed on the substrate 22 nor the transparent conductive film and alignment film formed on the substrate 24 extends over the adhesion reinforcing portion 50a. Therefore, the sealing material 28 can be directly contacted with the gate insulating film 38 of the substrate 22 and the light-shading layer (a black matrix made from a metal such as Cr) of the substrate 24 in the adhesion reinforcing portion 50a. Since both the gate insulating film 38 and the light-shading layer have excellent adhesiveness to the sealing material 28 (for example, an epoxy region), the substrates 22 and 24 are adhered together with an adequate adhesive strength by the sealing material 28. The adhesion reinforcing portion 50a is formed in a corner portion of the interlayer insulating film 50, because it does not affect the display characteristics of the liquid crystal display device in the corner portion. Therefore, the adhesion reinforcing portion 50a may be formed in any location of the interlayer insulating film 50, so long as it does not affect the display characteristics of the liquid crystal display device.

The following illustrates a process for producing the liquid crystal display device of this embodiment. First, a glass substrate is used as the substrate 22. A single layer or multi-layers of a metal film such as Ta, Ti, Al, Cr and the like are deposited on the substrate 22 by a sputtering method, and patterned to form a gate bus line and a storage capacitor bus line. In this embodiment, Ta is used. Subsequently, a silicon nitride ($SiN_x$) is deposited at 3000 angstroms to form a gate insulating film 38 by a plasma CVD method. A semiconductor layer 40 is formed by a plasma CVD method. The semiconductor layer is made from, for example, an amorphous silicon (a-Si), and has for example a film thickness of about 1000 angstroms. Then, the semiconductor layer 40 is patterned, and phosphorus-doped amorphous silicon layers 42 and 44 are formed. These layers 42 and 44 are formed in order to accomplish an ohmic contact between the semiconductor layer 40 and the subsequently formed source electrode 46 and drain electrode 48. In this embodiment, a phosphorus-doped amorphous silicon is deposited at a thickness of 800 angstroms by a plasma CVD method, and then patterned by any suitable method to form the phosphorus-doped amorphous silicon layers 42 and 44. Subsequently, a metal such as Ta, Ti, Al, Cr and the like is deposited by a sputtering method, and then patterned by any suitable method to form a source bus line 8 and a source electrode 46. In this embodiment, Ta is used. A transparent conductive film is further formed by any suitable method, and patterned to form a drain electrode 48. In this embodiment, the transparent conductive film is formed using a tin-doped indium oxide by a sputtering method. A photosensitive acrylic resin is further coated by a spin coating method to form an interlayer insulating film 50. The interlayer insulating film is exposed in the desirable pattern, and developed with an alkaline solution. Thus, only the exposed portion is etched to form a contact hole 30 penetrating the interlayer insulating film 50. An adhesion reinforcing portion 50a is formed at the same time of the formation of the contact hole. Then, A pixel electrode 18 is formed on the interlayer insulating film 50. In this embodiment, the pixel electrode 18 is formed by depositing a tin-doped indium oxide film by a sputtering method, and patterning the film.

On the other hand, a glass substrate is used as the substrate 24 in this embodiment. A color filter layer 58 comprising color layers providing red, blue and green transmitting lights and arranged in a stripe shape is formed on the substrate 24. A light-shading layer for preventing the switching element from operating mistakenly by an incoming light from outside is formed between each of the color layers. In this embodiment, an acrylic resin comprising the prescribed color pigment dispersed therein is used for the color layers, and Cr is used for the light-shading layer. A transparent counter electrode 18 is formed on the color filter 58 by a sputtering method using a tin-doped indium. In the formation of the counter electrode, it is preferred that the counter electrode be not formed by using a mask in a portion with which the sealing material is contacted, because the sealing material has an inadequate adhesiveness to the counter electrode.

On each of the substrates 22 and 24 thus fabricated, a polyimide resin-containing solution is coated by an offset printing method to form alignment films 54 and 60. In the formation of the alignment films, the alignment films 54 and 60 are not formed in a portion with which the sealing material 28 is contacted by using a suitable printing plate. This is to prevent water from invading inside the liquid crystal display device due to the polyimide resin which is highly hygroscopic, and to increase the adhesive strength of the sealing material 28. The substrates 22 and 24 on which the alignment films are formed are baked in an oven, and the alignment films are subjected to rubbing treatment. Then, a spacer 62 is sprinkled on the surface of the substrates 22 and 24, which are struck together through the sealing material. A polymer bead having the prescribed size are used for the spacer 62, and a resin (for example, an epoxy resin) is used for the sealing material 28. Thereafter, a liquid crystal material which constitutes a liquid crystal layer 64 is injected between the adhered substrates by a vacuum injection method. Thus, the liquid crystal display device is fabricated.

Embodiment 4

This embodiment, and Embodiments 5 and 6 described later, illustrate cases in which an outflow preventing portion is formed under the sealing material.

Figure 21:
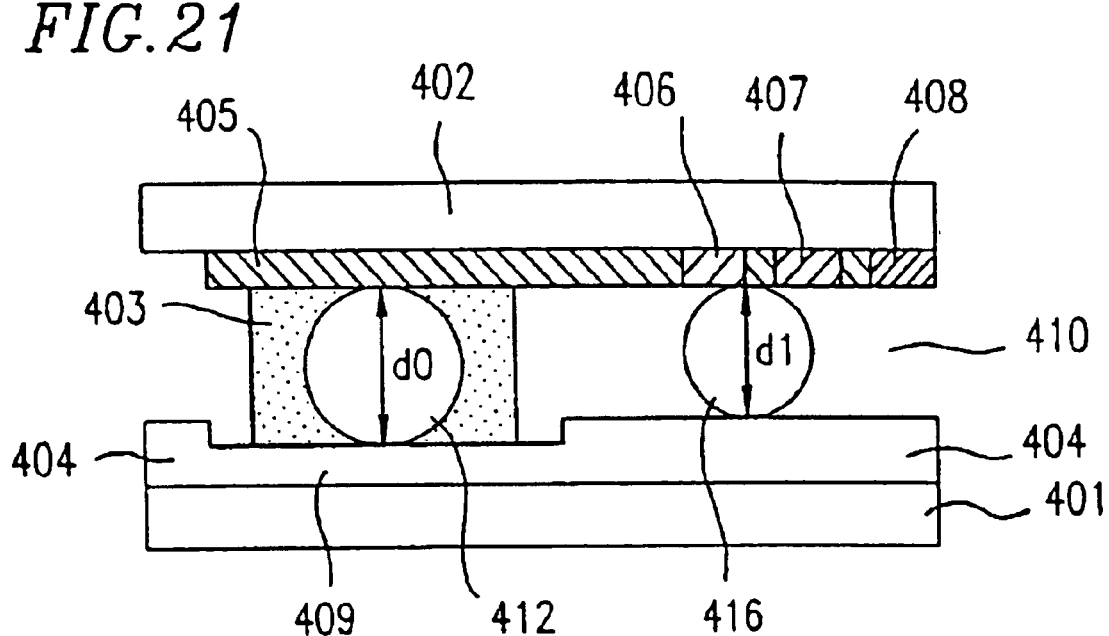
FIG. 21 is a schematic cross-sectional view showing the vicinity of the sealing material of a liquid crystal display device according to a preferred embodiment of the present invention.
Figure 22:
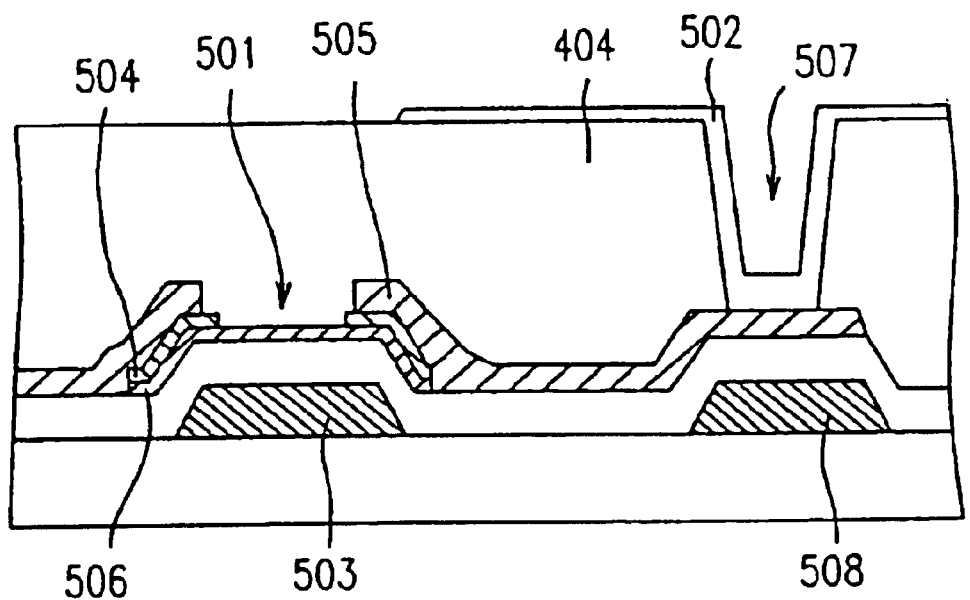
FIG. 22 is a schematic cross-sectional view of the TFT substrate used for the liquid crystal display device of FIG. 21.
Figure 23:
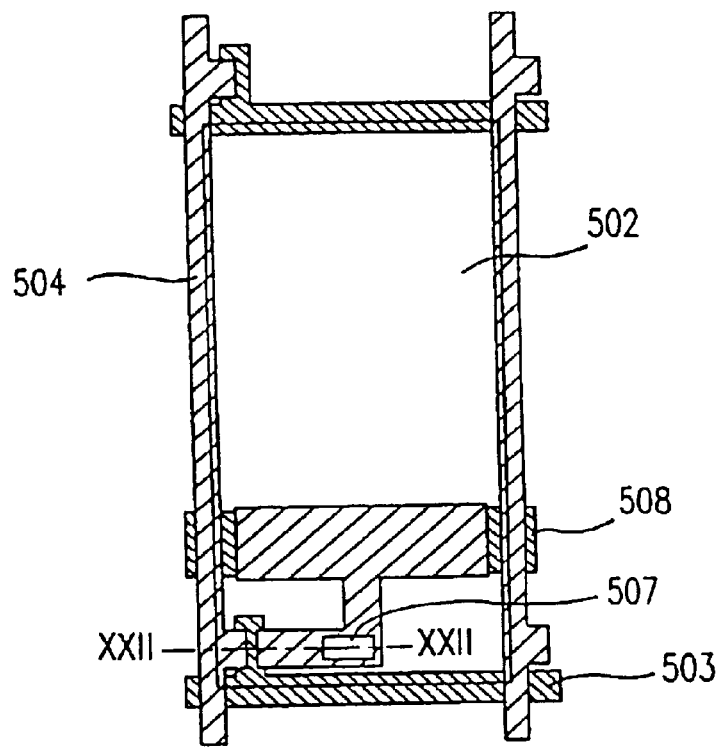
FIG. 23 is a schematic plan view of the TFT substrate of FIG. 22.

FIG. 21 is a schematic cross-sectional view showing the vicinity of the sealing material of a liquid crystal display device in this embodiment. FIG. 22 is a schematic cross-sectional view of the active matrix substrate used for the liquid crystal display device. FIG. 23 is a schematic plan view of the active matrix substrate of FIG. 22. FIG. 22 corresponds to a cross-section taken along with the A-A' line of FIG. 23.

The liquid crystal display device comprises an active matrix substrate 401 and a color filter substrate 402 both of which are opposite to each other, and a sealing material 403 formed in the periphery portion between the substrates 401 and 402. Preferably, the sealing material 403 is continuously formed on the four sides of the periphery portion. A liquid crystal layer 410 is interposed between the substrates 401 and 402 with being sealed by the sealing material 403. The liquid crystal layer contains any suitable liquid crystal material. The substrates 401 and 402 are disposed at the prescribed cell gap by using a spacer 412 contained in the sealing material (an intra-sealing spacer) and a spacer 416 sprinkled on the display portion (a liquid crystal layer spacer). A liquid crystal inlet which is closed after the injection of the liquid crystal material forming the liquid crystal layer 410 is formed in the sealing material 403.

An interlayer insulating film 404 is formed on the entire surface of the color filter 402 side of the active matrix substrate 401. The interlayer insulating film 404 is extended to the outside of the sealing material 403. The interlayer insulating film 404 is formed, for example, using a photosensitive acrylic resin by a spin coating method. A pixel electrode 502 which is a transparent conductive film is formed on the interlayer insulating film 404 in a matrix shape, as illustrated in FIG. 22, and a region on which the pixel electrode 502 is formed constitutes a display portion. The transparent conductive film which constitutes the pixel electrode 502 is formed, for example, by a sputtering method. The above-described sealing material 403 is formed on the periphery portion of the substrates as surrounding the display portion. Under the interlayer insulating film 404, any suitable TFT 501 is formed in a matrix shape, and a scanning line 503 and a signal line 504 for transmitting a gate signal and a source signal (a display signal), respectively, to the TFT 501 are also formed. The scanning line 503 and the signal line 504 are formed as crossing at a right angle to each other. A part of the scanning line 503 constitutes a gate electrode of the TFT 501, while a part of the signal line 504 constitutes its source electrode. One terminal of a connecting piece is electrically connected to a drain electrode 505 of the TFT 501, while the other terminal of the connecting piece is electrically connected to the pixel electrode 502 through a contact hole 507 formed as penetrating the interlayer insulating film 404. Also, a storage capacitor line 508 is extended under the contact hole.

An outflow preventing portion 409 is further formed in the interlayer insulating film 404 under the sealing material 403. In this embodiment, the outflow preventing portion 409 is a thinner film thickness portion of the interlayer insulating film 404. For example, the thickness of the interlayer insulating film is 3 μm, while the thickness of the outflow preventing portion 409 is 1.8 μm. The outflow preventing portion 409 may comprise two or more portions having different thickness. That is, portions having different thickness (for example, convex portion or concave portions) may be formed in the prescribed location of the outflow preventing portion 409 depending upon its purposes. The thickness of the outflow preventing portion 409 may suitably be varied (for example, from zero up to the thickness of the interlayer insulating film) depending upon its purposes.

On the color filter substrate 402, a color filter having red (R), green (G) and blue (B) color layers 406, 407 and 408 divided by a black matrix 405 is formed. The color layers 406, 407 and 408 are formed using an acrylic resin or gelatin on a region corresponding to the pixel electrode 502 of the above-described display portion.

According to a structure as described above, since the pixel electrode which applies an electric field on the liquid crystal layer inside the display region can be formed as overlapping the signal line and the like made from a metal, a portion other than the signal line and the TFT pattern becomes a display aperture, which results in a very bright liquid crystal display device.

When the pixel electrode is overlapped with the signal line through the interlayer insulating film, the thickness of the interlayer insulating film is set so that a capacity generated in the overlapping portion does not affect the display quality. The thickness of the interlayer insulating film may be varied depending upon the dielectric constant, etc., of the interlayer insulating film material. For example, because the dielectric constant ∈ of the photosensitive acrylic resin employed is 3.7 in this embodiment, the thickness of the interlayer insulating film is set 3 μm.

Figure 24:
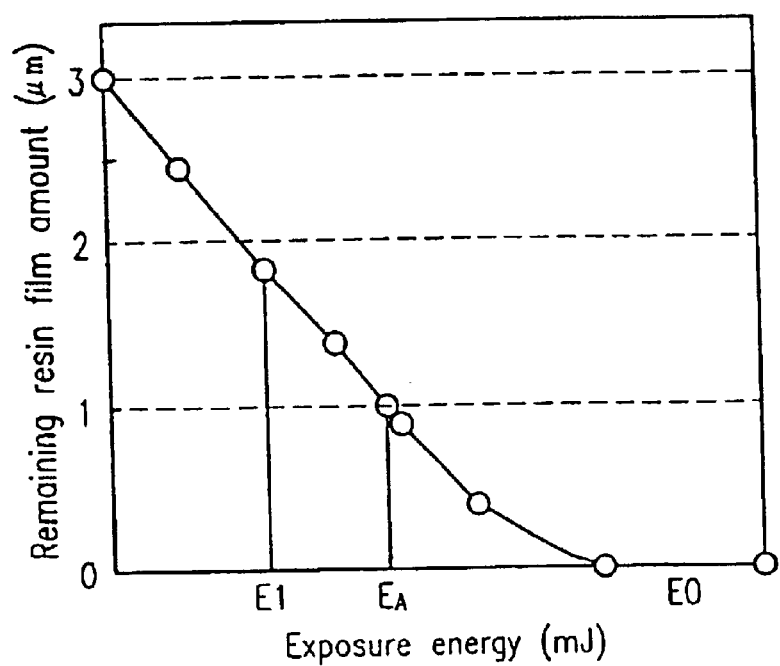
FIG. 24 is a graph showing a relationship between the exposure energy and the remaining resin film amount of a positive-type photosensitive resin.

In this embodiment, a positive-type photosensitive resin is used as the photosensitive acrylic resin, and the thickness of the outflow preventing portion is 1.8 μm. That is, a part of the interlayer insulating film an under the lower portion of the sealing material is removed by 1.2 μm from its total thickness of 3 μm. The removal is made by utilizing a relationship between the exposure energy and the remaining resin film amount of the positive-type photosensitive resin as illustrated in FIG. 24, wherein the remaining resin film amount indicates a thickness of the film remaining after the development. The molecular bonds of the resin molecules in the exposed portion are decomposed by light energy, and the decomposed molecules are dissolved in a developer. As a result, only the non-exposed portion (a portion having resin molecules with non-decomposed molecular bonds) remains as the film. Actually, because the exposure energy is absorbed by the resin molecules located closer to the surface of the film which is successively decomposed, the remaining resin film amount can be controlled by the control of the exposure energy.

Actually, an energy $E_0$ required for the complete removal of the interlayer insulating film and an energy $E_1$ required for only the 1.2 μm removal of the interlayer insulating film are determined in this embodiment. Then, a region in which the film is to be completely removed (for example, the contact hole, the terminals, and the like) is subjected to the exposure treatment with an exposure energy of $E_0$, while a region in which the film is to be only partially removed (for example, the outflow preventing portion under the sealing material) is subjected to the exposure treatment with an exposure energy $E_1$, and then both regions are developed. According to this procedure, it is possible to simultaneously pattern both regions.

The same exposure procedure can be applied in the case of forming several outflow preventing portions having two or more different thicknesses. When several outflow preventing portions having a types of different thicknesses are formed, the prescribed locations of the interlayer insulating film are exposed with n classes of the exposure amounts, and developed. Specifically, the exposure can be made by the following procedure. When n types of the remaining resin film amounts (the thicknesses) are $D_1 > D_2 > \ldots > D_{n-1} > D_n$ and the exposure energies (the exposure amounts) are $E_1$, $E_2, \ldots, E_{n-1}, E_n$, the entire region to be exposed is first exposed with $E_1$. Then, a region for a thickness of $D_2$ is exposed with an exposure amount of $E_2-E_1$, and a region for a thickness $D_3$ is successively exposed with an exposure amount of $E_3-E_2$, and finally a region for a thickness of $D_n$ is exposed with an exposure amount of $E_{n-1}-E_n$. As a result, several outflow preventing portions having n types of different thicknesses are obtained. The formation of several outflow preventing portions having different thicknesses in the prescribed locations can further prevent the outflow or gushing of the sealing material.

A resin material is used for a black matrix (BM) of the color filter substrate. This resin material is, for example, an acrylic resin comprising a pigment dispersed therein as with the color filter layer. When a resin material is used, a large-scale device (for example, a sputtering device) which is used for a metal material is not required. That is, a black resin layer which is formed in the prescribed location in the formation of the color filter layer can be the BM. Therefore, the use of a resin material is very advantageous in light of the cost.

Figure 25:
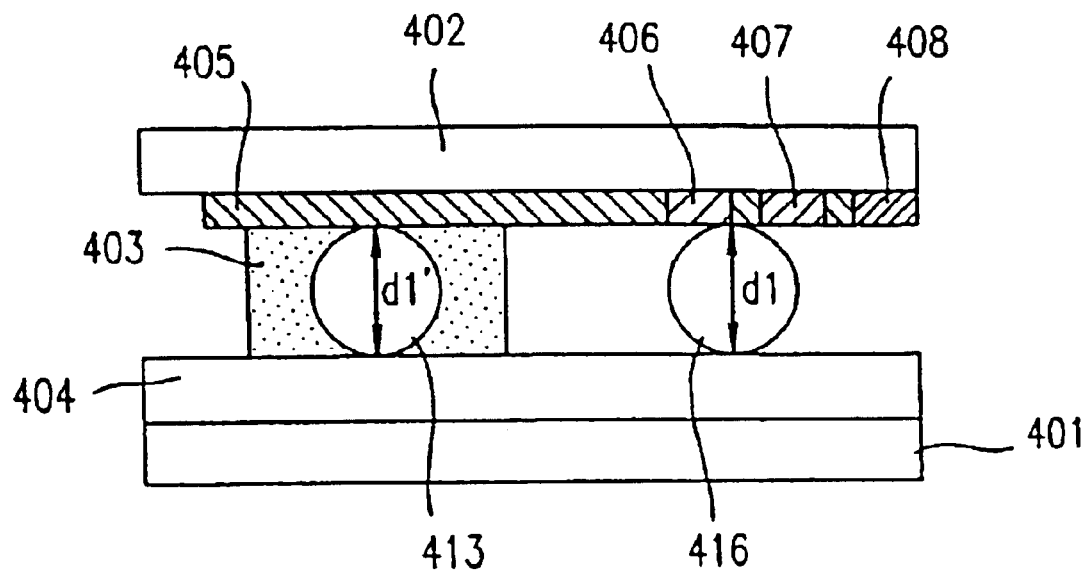
FIG. 25 is a schematic cross-sectional view of the conventional liquid crystal display device for comparison.
Figure 26:
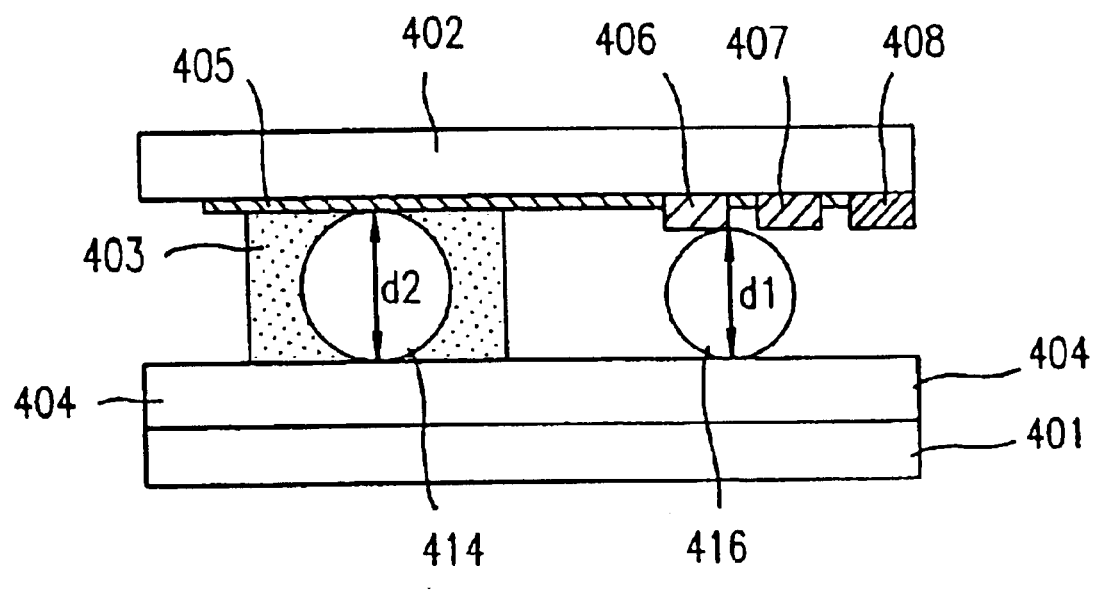
FIG. 26 is a schematic cross-sectional view of the conventional liquid crystal display device for comparison.

However, when a resin material is used for the BM of the conventional liquid crystal display device, it is necessary for the resin BM to have a film thickness of 1.5 $\mu$m, compared to a metal BM which requires a thickness of only 0.3 $\mu$m for shading a light. Since the thickness required for the resin BM is substantially the same as the film thickness of the color filter which is also 1.5 $\mu$m, the diameter d1' of an intra-sealing spacer 413 is substantially identical to the diameter d1 of a liquid crystal layer spacer 416 in the conventional liquid crystal display device, as illustrated in FIG. 25. According to such a structure, the outflow of the sealing material is remarkable at the time of adhering together the substrates. Thus, a metal material is used as the BM in the conventional liquid crystal display device to create a difference in level between the diameter d2 of an intra-sealing spacer 414 and the diameter d1 of the liquid crystal layer spacer 416 which corresponds to the film thickness difference (1.2 $\mu$m) between the color filter and the metal BM, as illustrated in FIG. 26. In this case, a large-scale device (for example, a sputtering device) is required for the formation of the metal BM. Therefore, both the reduction of the cost and the prevention of the poor display caused by the outflow of the sealing material do not stand together in the conventional liquid crystal display device.

According to the present invention, the separation and outflow of the low viscous resin component in the sealing material can be prevented by the formation of the outflow preventing portion, even when a level between the color filter layer and the BM is constant by using a resin BM.

Figure 7:
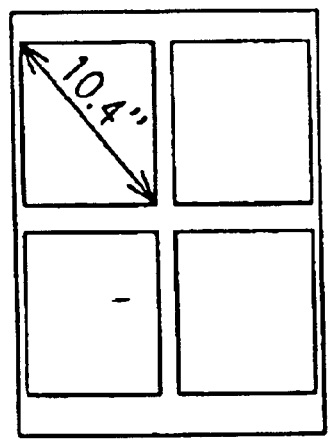
FIG. 7 is a schematic view illustrating a display screen size (10.4") of a liquid crystal display device used for a test demonstrating the effects of the present invention.
Figure 8:
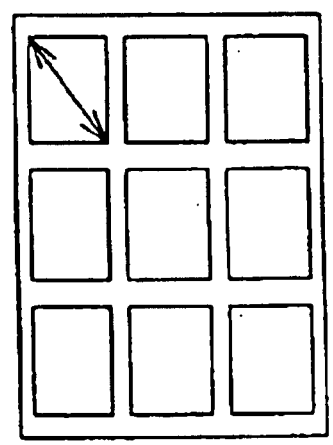
FIG. 8 is a schematic view illustrating a display screen size (6.4") of a liquid crystal display device used for a test demonstrating the effects of the present invention.

The following experiment was actually conducted in order to confirm the effects of the liquid crystal display device of this embodiment. Four liquid crystal display devices having a display diagonal size of 10.4 inches as shown in FIG. 7 were provided on a glass substrate of 465×360×1.1 mm (7059, manufactured by Corning Corp.). A thermosetting resin (XN-21S manufactured by Mitsui Toatsu Kagaku, Corp.) was used as the sealing material, and the diameter of the liquid crystal layer spacer (i.e., a cell gap of the liquid crystal layer) was set 4.5 $\mu$m. The separation phenomenon of the resin component of the sealing material was observed as varying (1) a reduction amount of the film thickness of a part of the interlayer insulating film under the sealing material (the thickness of the outflow preventing portion is a difference between the original thickness of the interlayer insulating film and its reduction amount), (2) a pressing load, and (3) a heating rate until reaching the curing temperature of the sealing material (170° C.). The results are illustrated in Table 4.

TABLE 4

| | Reduction amount of the film thickness of the interlayer insulating film ($\mu$m) | Adhering conditions | | |
|---|---|---|---|---|
| | | Pressing load | 1000 kg | | 1200 kg |
| | | Heating speed | 5° C./min. | 10° C./min. | 10° C./min. |
| Embodiment 4 | 0.5 | | Δ | X | X |
| | 0.8 | | ○ | Δ | Δ |
| | 1.0 | | ○ | ○ | ○ |
| | 1.2 | | ○ | ○ | ○ |
| | 1.5 | | ○ | ○ | ○ |
| | 2.0 | | ○ | ○ | ○ |
| | 2.5 | | ○ | ○ | ○ |
| Conventional | 0.0 | | Δ | Δ | X |

As can be seen from Table 4, when the reduction amount of the film thickness of a part of the interlayer insulating film under the sealing material is 1 $\mu$m or more, good results are obtained regardless of either the pressing load or the heating rate.

The variation of the cell gap in the vicinity of the sealing material was measured (at a site of the display region 5 mm apart from the sealing material) with respect to the reduction amount of the film thickness of a part of the interlayer insulating film under the lower portion of the sealing material. The results are illustrated in Table 5.

TABLE 5

| Reduction amount of the film thickness of the interlayer insulating film ($\mu$m) | 0.5 | 1.0 | 1.5 | 2.0 | 2.5 | 3.0 |
|---|---|---|---|---|---|---|
| Variation of cell gap ($\mu$m) | ±0.1 | ±0.1 | ±0.15 | ±0.2 | ±0.25 | ±0.3 |

As can be seen from Table 5, the variation of the cell gap is greater with the increase of the reduction amount. This is because a certain variation (normally, ±10%) exists with respect to an absolute value of the film thickness during an ordinary film manufacturing process (for example, spin coating, sputtering, printing). In this case, because the variation of the cell gap corresponds to the variation of the reduction amount, the variation of the cell gap becomes greater with the increase of the reduction amount. Eventually, the variation of the cell gap corresponds to the variation of the film thickness. That is, the variation of the cell gap will be greater, when a part of the interlayer insulating film under the sealing material is completely removed.

As can be seen from Tables 4 and 5, the liquid crystal display device comprising an interlayer insulating film having an outflow preventing portion according to this embodiment and a process for producing the same are effective for reducing the variation of the cell gap and preventing the separation phenomenon of the resin component of the sealing material.

An interlayer insulating film to which the present invention is applied is not limited to a single layer structure, but may have a multi-layer structure with two or more layers. Also, an outflow preventing portion may be formed in a portion other than the interlayer insulating film. For example, the same effect can be attained by an outflow preventing portion which is a difference in level created between the display region of the active matrix substrate and the sealing material.

Embodiment 5

Figure 27:
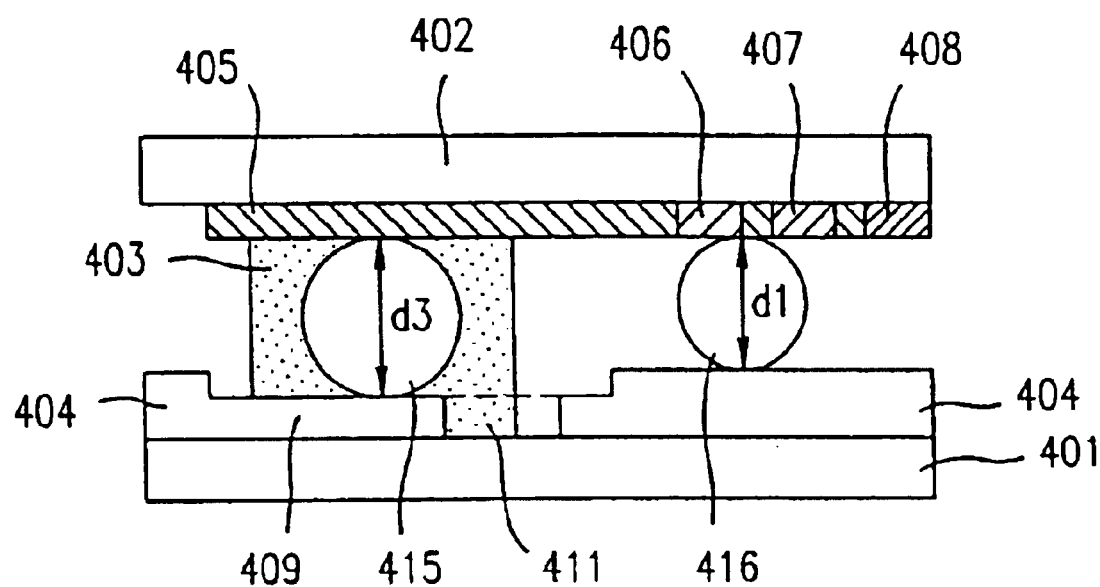
FIG. 27 is a schematic cross-sectional view showing the vicinity of the sealing material of a liquid crystal display device according to another embodiment of the present invention.
Figure 28:
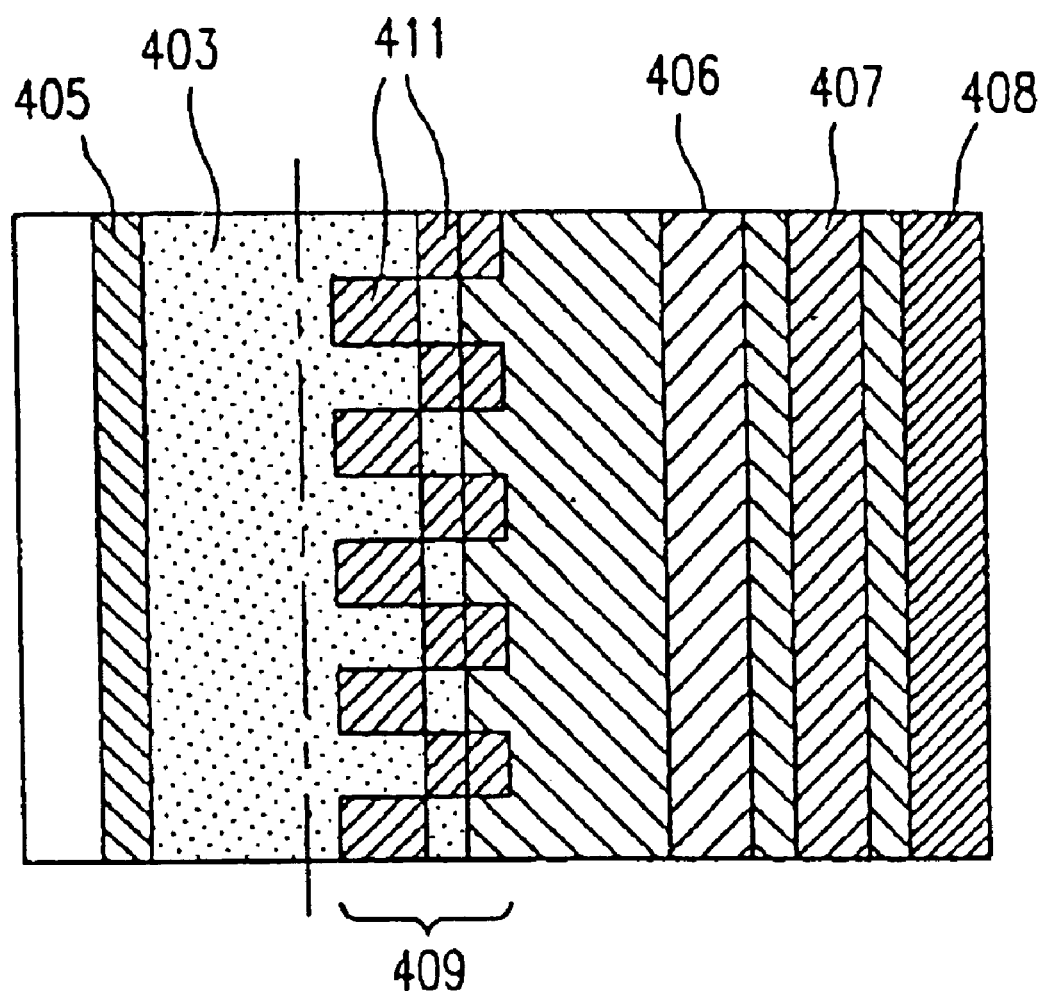
FIG. 28 is a schematic plan view of the liquid crystal display device of FIG. 27.

The following illustrates another embodiment of the present invention with reference to FIGS. 27 and 28. Since a general structure of the liquid crystal display device is the same as that of Embodiment 4, only a characteristic portion of this embodiment is illustrated, and omitting the structural elements having the same functions as those of Embodiment 4.

In this embodiment, the outflow preventing portion 409 has concave portions 411 (i.e., the outflow preventing portion 409 has two or more portions having different thicknesses). For example, the concave portions 411 may alternatively be arranged on either side of one straight line. The adjacent concave portions arranged on either side of the straight line are at least in contact or overlap with each other, and the concave portions arranged on the same side of the straight line are separated from each other by a flat portion. The concave portions 411 are formed, for example, in a checkered pattern, as illustrated in FIG. 28. A pitch of each concave portion of the outflow preventing portion (an interval between the adjacent rectangles arranged on the same side) corresponds to, for example, a pixel pitch. In this embodiment, the concave portions are formed by completely removing the interlayer insulating film as with the contact holes of the pixel electrode, the terminals, and the like, but the depth of each concave portion may suitably be adjusted. The shape of each concave portion viewed from the normal line direction of the substrate may be, for example, rectangle, square, or a polygon (for example, trapezoid, pentagon, hexagon).

Figure 29A:
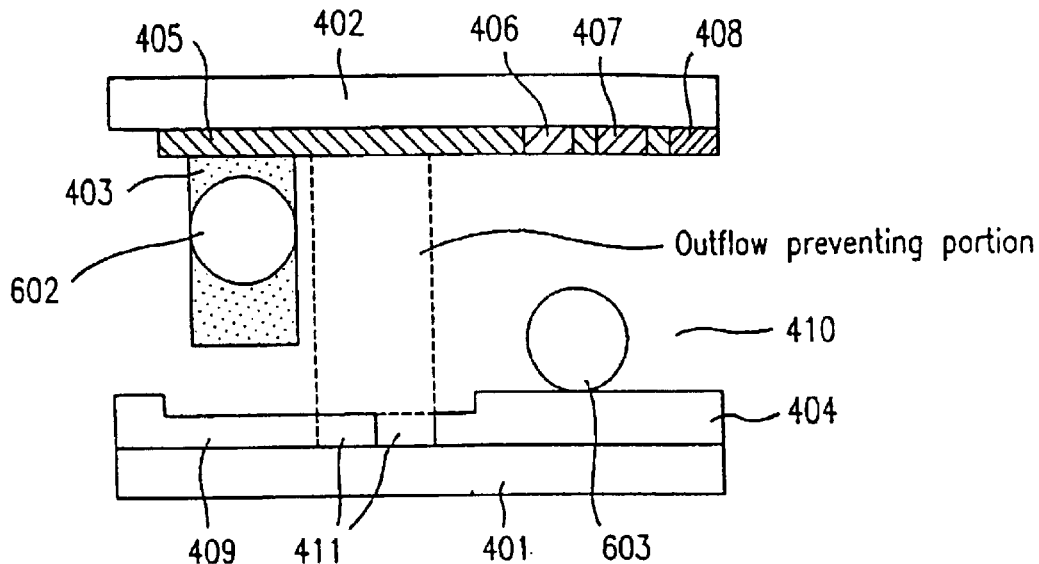
FIGS. 29A to 29C are schematic cross-sectional views showing a process for producing a liquid crystal display device according to a preferred embodiment of the present invention.
Figure 29B:
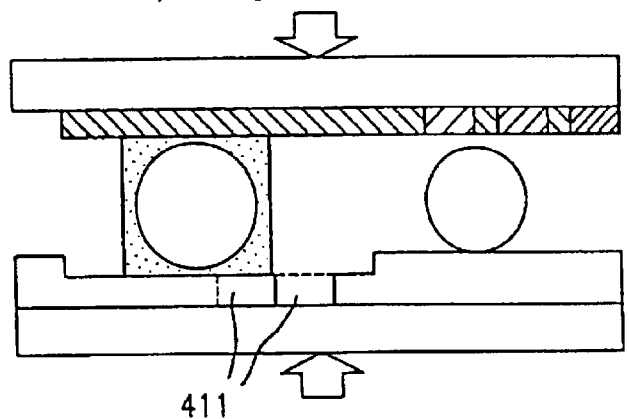
Figure 29C:
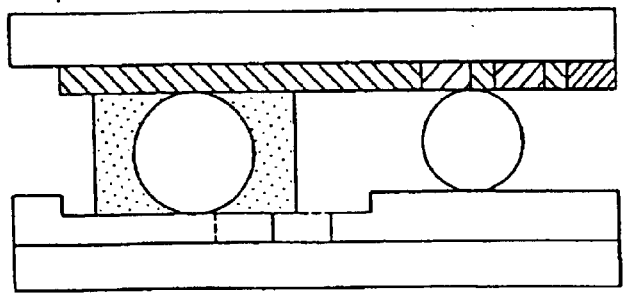

The concave portions 411 are formed on the liquid crystal layer 410 side from the center of the width of the sealing material 403 (the width of the sealing material is 1000 to 1200 $\mu$m in this embodiment). The sealing material 403 has a width of 300 $\mu$m at the time of its formation on the color filter substrate 402, and is designed as not overlapping the concave portion 411 with the sealing material 403 at the time of its formation, as illustrated in FIG. 29A. Then, as illustrated in FIG. 29B, the active matrix substrate and the color filter substrate are adhered together, and pressed with a load until the prescribed cell gap is obtained. The sealing material 403 is deformed into a compressed shape by the pressing. At this time, the sealing material is deformed into a compressed shape having the prescribed sealing width as pushing out the bubbles in the concave portion 411. As a result, it prevents the bubbles of the concave portion from remaining in the sealing material. As illustrated in FIG. 29C, the adhering of the substrates is completed at the time of the completion of the curing of the sealing material.

The following experiment was actually conducted in order to confirm the effects of the liquid crystal display device of this embodiment. The following illustrates the detail. Four liquid crystal display devices having a display diagonal size of 10.4 inches as shown in FIG. 7 were provided on a glass substrate of 465×360×1.1 mm (7059, manufactured by Corning Corp.). A thermosetting resin (XN-21S manufactured by Mitsui Toatsu Kagaku, Corp.) was used as the sealing material. The separation phenomenon of the resin component of the sealing material was observed as varying (1) a reduction amount of the film thickness of the interlayer insulating film located under the lower portion of the sealing material (the thickness of the outflow preventing portion is a difference between the original thickness of the interlayer insulating film and its reduction amount), and (2) a diameter of the liquid crystal layer spacer (i.e., the cell gap of the liquid crystal layer). The results are illustrated in Table 6. The adhering conditions of the substrates were a pressing load of 1200 kgf, and a heating rate until reaching the curing temperature (170° C.) of 10° C./minute.

TABLE 6

| | Reduction amount of the film thickness of the interlayer insulating film ($\mu$m) | Cell gap in a display region ($\mu$m) | | | | |
|---|---|---|---|---|---|---|
| | | 5.0 | 4.0 | 3.0 | 2.0 | 1.0 |
| Embodiment 5 | 0.5 | ○ | ○ | △ | X | X |
| | 0.8 | ○ | ○ | △ | △ | X |
| | 1.0 | ○ | ○ | ○ | ○ | X |
| | 1.2 | ○ | ○ | ○ | ○ | △ |
| | 1.5 | ○ | ○ | ○ | ○ | △ |
| | 2.0 | ○ | ○ | ○ | ○ | ○ |
| | 2.5 | ○ | ○ | ○ | ○ | ○ |
| Embodiment 4 | 1.0 | ○ | ○ | △ | X | X |
| Conventional | 0.0 | △ | X | X | X | X |

As can be seen from Table 6, no separation phenomenon of the resin component of the sealing material is observed when (1) the reduction amount of the film thickness of the interlayer insulating film in the sealing region is 1 $\mu$m and (2) the diameter of the spacer in the display region (the liquid crystal layer) is up to 2 $\mu$m.

In this embodiment, a contact hole of an inspection pad for the wire breakage inspection of the signal line may be formed under the sealing material, and used together with the outflow preventing portion. In this case, it is preferred that the ratio of the areas of the concave portions to a part of the interlayer insulating film on which the sealing material is formed be as equal as possible in the four sides of the substrates in order to provide a uniform cell gap in the four sides of the substrates. Thus, an inspection pad-shaped concave portion may be formed on a side on which the inspection pad is not formed.

Although the outflow preventing portion is formed on the liquid crystal layer side of the sealing material in this embodiment, it may be formed on the outside of the sealing material. In this case, it is also possible to prevent the resin component of the sealing material from flowing out in the same manner. The outside of the sealing material provides an increased cell gap due to the difference in level between the color filter substrate and the black matrix, as illustrated in FIG. 27. Therefore, the resin component of the sealing material does not usually flow out into the display portion located inside the sealing material, and thus no poor display caused by the sealing material occurs.

Embodiment 6

The following illustrates a liquid crystal display device and a process for producing the same in another embodiment of the present invention with reference to FIGS. 30 to 35, 37 and 38.

The liquid crystal display device of this embodiment comprises an active matrix substrate 606, a counter substrate 601 (a color filter substrate) which is adhered to the active matrix substrate through a sealing material 602, and a liquid crystal layer disposed between the substrates.

Figure 30:
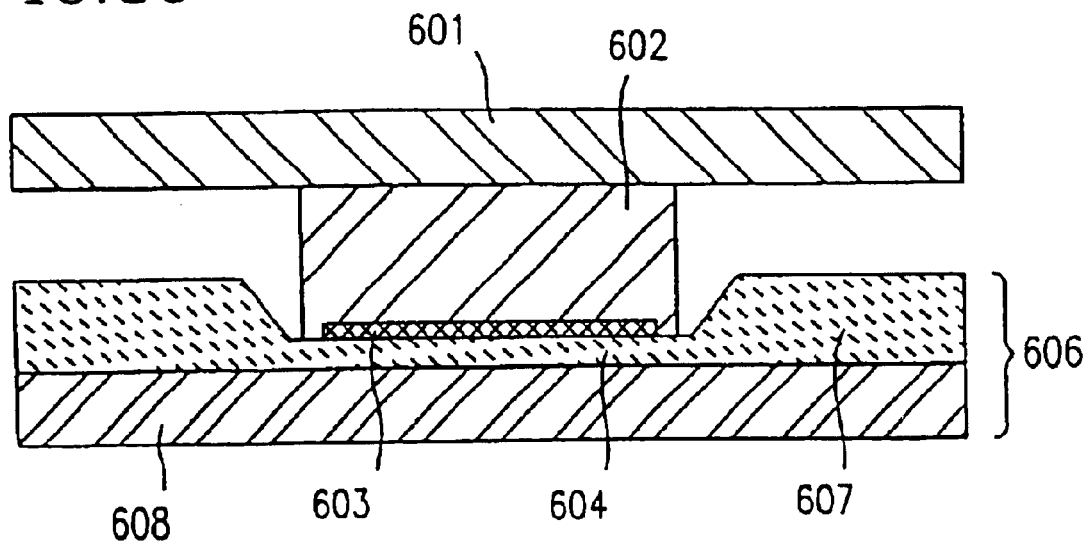
FIG. 30 is a schematic cross-sectional view showing the vicinity of the sealing material of a liquid crystal display device according to still another embodiment of the present invention in a direction crossing at a right angle of the sealing material.

The active matrix substrate 606 comprises a gate electrode 609, a gate insulating film 610, a semiconductor layer 611, an $n^+$-Si layer 612 which constitutes a source and drain electrode, a metal layer 613 which constitutes a source signal line, an interlayer insulating film 607, and a transparent conductive layer (for example, ITO film) 603 which constitutes a pixel electrode, all of which are formed in this order on a transparent insulating substrate 608. The pixel electrode is electrically connected to the drain electrode of the TFT through a contact hole 614 penetrating the interlayer insulating film 607. As illustrated in FIG. 30, an outflow preventing portion 604 is formed in the interlayer insulating film 607 under the sealing material in this embodiment. The outflow preventing portion is a thinner film thickness portion of the interlayer insulating film 607. In this embodiment, the thickness of the interlayer insulating film is 3 μm, and the thickness of the outflow preventing portion is 1.0 μm. Also, the transparent conductive layer 603 is formed between the outflow preventing portion 604 and the sealing material 602. The formation of the transparent conductive layer 603 between the outflow preventing portion 604 and the sealing material 602 can prevent, for example, the film lifting of the interlayer insulating film at the time of etching the transparent conductive layer 603.

The active matrix substrate is fabricated by, for example, the following procedure. For example, the gate electrode 609, the gate insulating film 610, the semiconductor layer 611, and the $n^+$-Si layer 612 which constitutes a source and drain electrode are formed in this order on the transparent insulating substrate 608 by any suitable method. Then, any suitable metal is deposited thereon by a sputtering method, and patterned to form the metal layer 613. Then, a photosensitive resin (for example, a photosensitive acrylic resin) is coated at the prescribed thickness (for example, 3 μm) by a spin coating method, and exposed and developed in the prescribed pattern to form the interlayer insulating film 607 together with the contact hole 614. In this embodiment, the outflow preventing portion is formed at the same time of the formation of the interlayer insulating film and the contact hole. The outflow preventing portion is formed by exposing the interlayer insulating film for the prescribed exposure period and developing it. For example, when the interlayer insulating film is made from a photosensitive acrylic resin, it is exposed with an exposure energy $E_O$ shown in FIG. 24 so as to completely remove a portion of the interlayer insulating film in a thickness direction, thereby forming the contact hole, while it is exposed with an exposure energy $E_A$ shown in FIG. 24 so as to partly remove a portion of the interlayer insulating film at the prescribed thickness (2 μm in this embodiment) in a thickness direction, thereby forming the outflow preventing portion (i.e., forming the outflow preventing portion having thickness of 1 μm). The development is conducted in any suitable developer (for example, an aqueous alkaline solution) under any suitable conditions. Then, the transparent conductive layer 603 which constitutes a pixel electrode is formed by a sputtering method, and patterned. The pixel electrode is electrically connected to the drain electrode of the TFT through the contact hole 614 penetrating the interlayer insulating film 607. In this embodiment, the patterning is conducted so that the transparent conductive layer (ITO film) 603 is disposed between the outflow preventing portion 604 and the sealing material 602, as illustrated in FIG. 30. The formation of the transparent conductive layer 603 between the outflow preventing portion 604 and the sealing material 602 can prevent, for example, the film lifting of the interlayer insulating film at the time of etching the transparent conductive layer 603.

Figure 31:
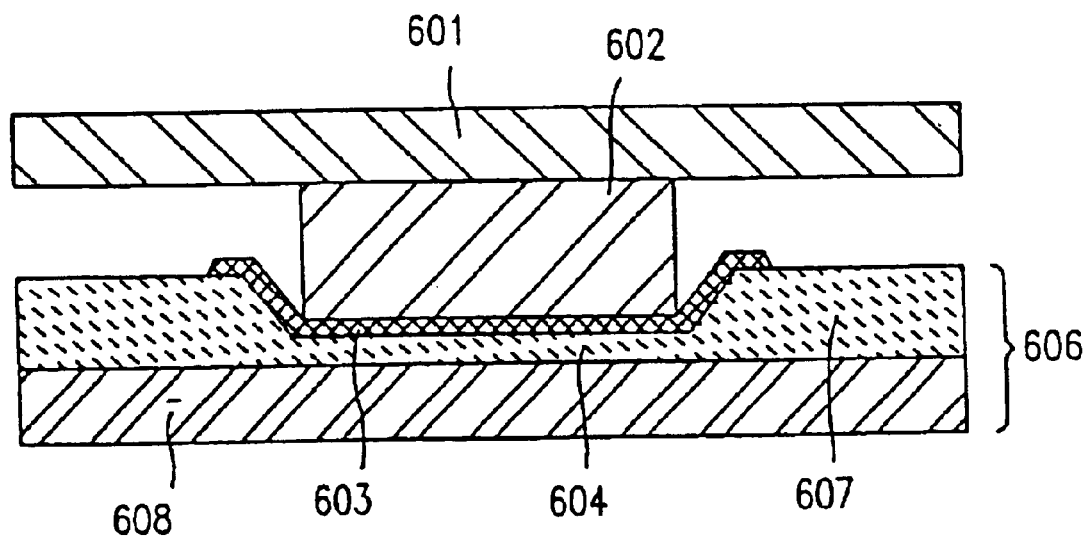
FIG. 31 is a schematic cross-sectional view showing the vicinity of the sealing material of a liquid crystal display device according to still another embodiment of the present invention in a direction crossing at a right angle of the sealing material.

According to a further preferred embodiment, the transparent conductive layer 603 between the outflow preventing portion 604 and the sealing material 602 is formed as covering the entire portion of the outflow preventing portion, 604, as illustrated in FIG. 31. According to such a structure, the interlayer insulating film is not contacted with an etchant, etc., at the time of the patterning of the ITO film 603. As a result, the above described effect of preventing the film lifting is further improved. FIGS. 30 and 31 are cross-sectional views in a direction crossing the sealing material at a right angle.

Figure 32:
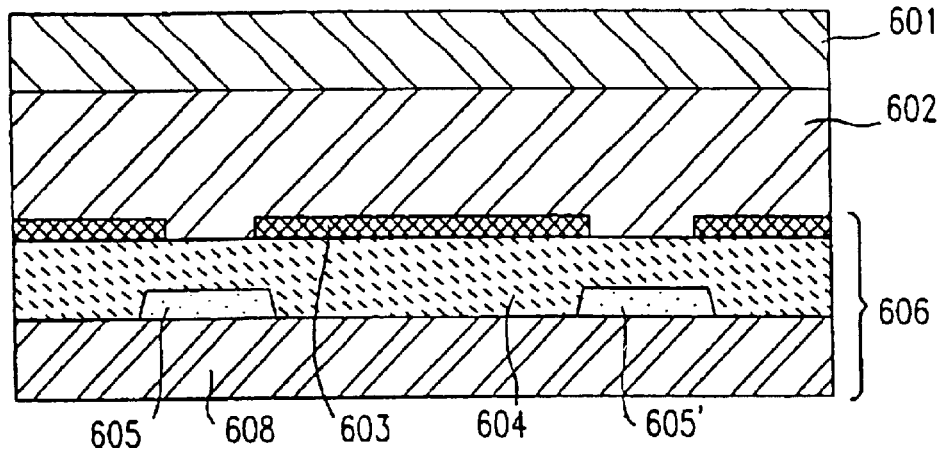
FIG. 32 is a schematic cross-sectional view showing the vicinity of the sealing material of a liquid crystal display device according to still another embodiment of the present invention in a direction parallel to the sealing material.
Figure 33:
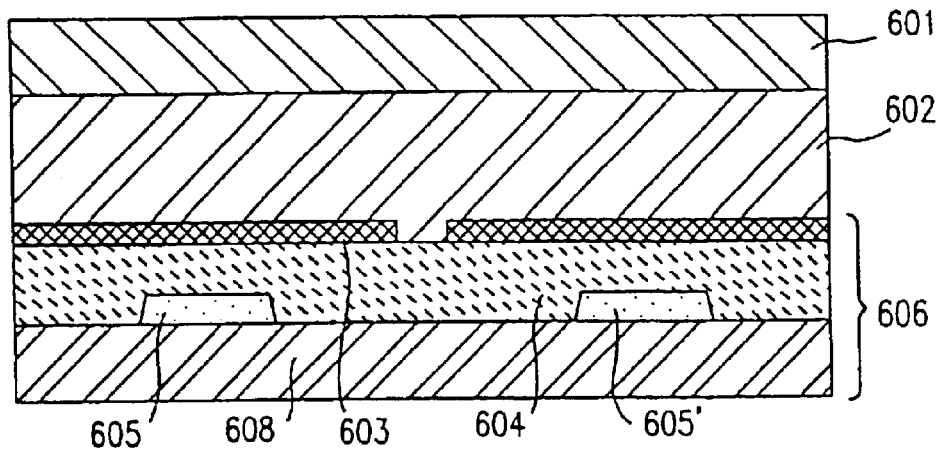
FIG. 33 is a schematic cross-sectional view showing the vicinity of the sealing material of a liquid crystal display device according to still another embodiment of the present invention in a direction parallel to the sealing material.

When a line 605 is formed under the lower portion of the outflow preventing portion 604, it is preferred that the ITO film 603 be not formed only on the line 605, as illustrated in FIG. 32 in order to prevent the line 605 from having a coupling capacity through the ITO film 603. In order to prevent the line 605 from having a coupling capacity through the ITO film 603, a slit-shaped pattern may also be formed in a portion of the ITO film 603 between the lines 605 and 605', as illustrated in FIG. 33.

Figure 34:
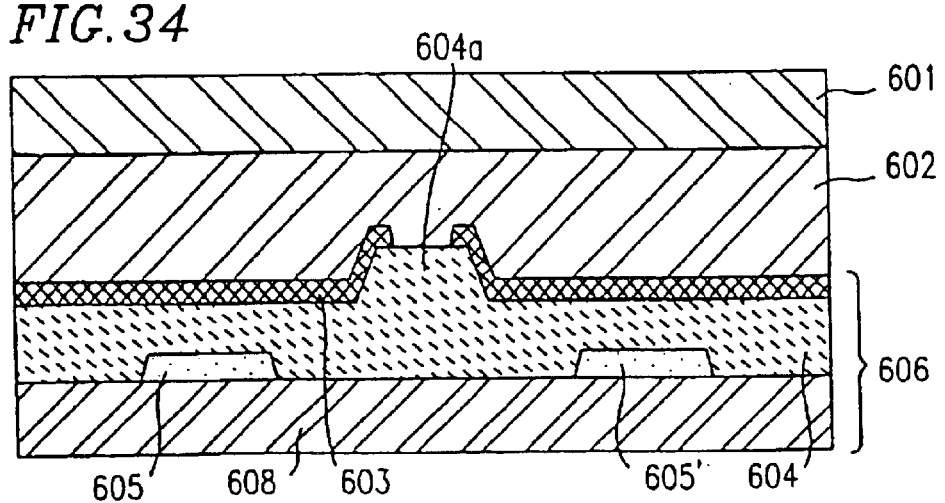
FIG. 34 is a schematic cross-sectional view showing the vicinity of the sealing material of a liquid crystal display device according to still another embodiment of the present invention in a direction parallel to the sealing material.

The formation of the ITO film 603 on the outflow preventing film 604 can prevent the film lifting and peeling, but it is preferred that the film lifting and peeling in a portion on which the ITO film is not formed be prevented so as to provide a further reliable liquid crystal display device. Thus, it is preferred that a film peeling preventing portion 604a be formed. The film peeling preventing portion 604a may be a convex portion formed in a part of the outflow preventing portion 604 between the lines 605 and 605', as illustrated in FIG. 34. Since the outflow preventing portion 604 is formed by making the film thickness of the interlayer insulating film thinner, the convex portion 604a is formed by maintaining the original film thickness of the interlayer insulating film at the prescribed location in the formation of the outflow preventing portion. Specifically, a portion between the lines 605 and 605' is not exposed at the time of the formation of the outflow preventing portion. As a result, the non-exposed portion maintains its original thickness while the exposed portion becomes the outflow-preventing portion having the prescribed thickness, so as to form the convex portion 604a. Since the convex portion 604a is not exposed, the crosslinking structure of its resin is maintained and thus stable against chemicals and the like. The ITO film 603 is formed on the outflow preventing portion thus formed, and then patterned by an ordinary photolithography. At that time, a portion of the ITO film 603 is removed in the convex portion 604a of the outflow preventing portion 604 by etching. Thus, a further reliable active matrix substrate (consequently, a liquid crystal display device) can be obtained.

Figure 35:
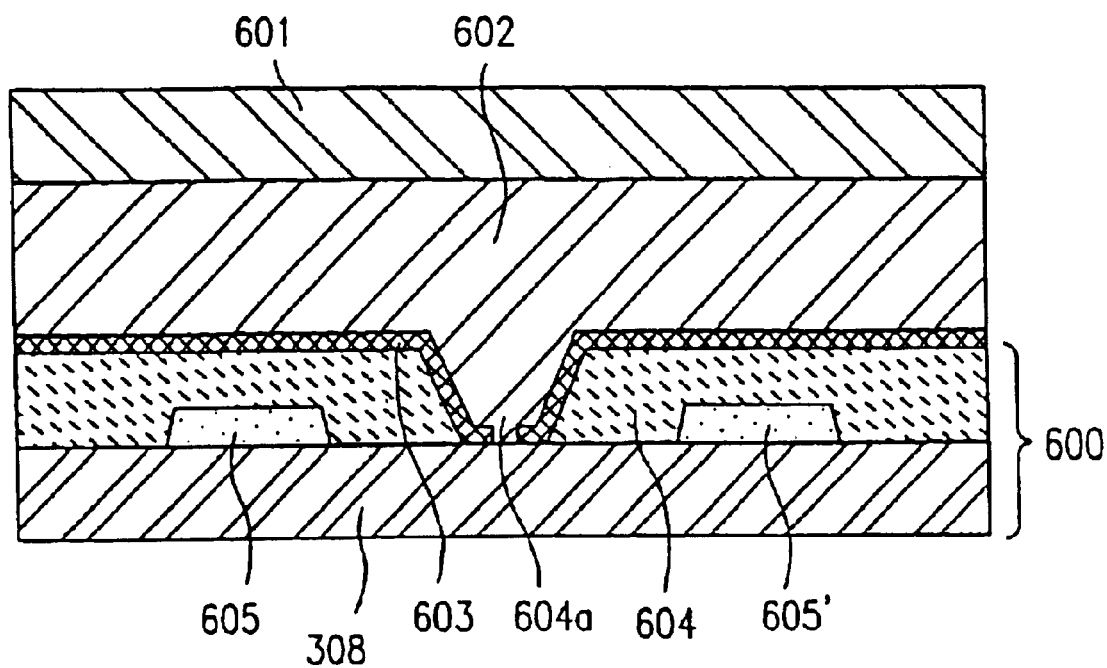
FIG. 35 is a schematic cross-sectional view showing the vicinity of the sealing material of a liquid crystal display device according to still another embodiment of the present invention in a direction parallel to the sealing material.

Alternatively, the film peeling preventing portion 604a may be a concave portion formed in a part of the outflow preventing portion between the lines 605 and 605', as illustrated in FIG. 35. The concave portion 604a is formed by removing a portion of the interlayer insulating film between the lines 605 and 605'. Specifically, a portion of the interlayer insulating film in which the film peeling preventing portion is formed is exposed for 3000 msec. at the time of the formation of the contact hole 614, and then the entire portion of the interlayer insulating film in which the outflow preventing portion is formed is exposed for 1800 msec. to form the outflow preventing portion 604 and the concave portion 604a. The ITO film 603 is formed on the outflow preventing portion thus formed, and then patterned by an ordinary photolithography. At that time, a portion of the ITO film 603 is removed in the concave portion 604a of the outflow preventing portion 604 by etching. Thus, a further reliable active matrix substrate (consequently, a liquid crystal display device) can be obtained. FIGS. 32 to 35 are cross-sectional views in a direction parallel to the sealing material.

On the effective display portion of the active matrix substrate 606 thus fabricated, an alignment film made from a polyimide or the like is formed to provide an alignment function by a treatment such as rubbing, UV irradiation, and the like. Also, a transparent counter common electrode is formed using ITO or the like on the counter substrate 601, and thereafter its effective display portion is subjected to the same treatment. A sealing material 602 is coated on the periphery portion of the panel by a printing procedure or the like in such a manner that the panel is surrounded by the sealing material. An inlet is formed in a portion of the sealing material. Moreover, a conductive material is attached to the signal input terminal for the counter electrode located on the active matrix substrate. Then, a spacer is sprinkled so as to provide a uniform cell gap of the liquid crystal layer, the liquid crystal layer and the counter electrode 601 are aligned, and the sealing material 602 is heated and cured. Thereafter, a liquid crystal is injected from the liquid crystal inlet which is then closed with a sealing material to complete the glass portion of the active matrix-type liquid crystal display device. FIG. 31 is a cross-sectional view showing the vicinity of the sealing material of the liquid crystal display device thus fabricated and taken along with the sealing material 602. As illustrated in FIG. 31, a portion having a wider gap between the glass substrates (i.e., the outflow preventing portion) is formed so as to relax the pressure imposed on the sealing material 602, thereby preventing the sealing material 602 from gushing.

The above-described embodiments may suitably be combined. For example, an adhesion reinforcing portion may be formed in the interlayer insulating film of the liquid crystal display device of Embodiment 1, and an outflow preventing portion may be formed in the interlayer insulating film of the liquid crystal display device of Embodiment 3. Also, for example, the light-shading layer (the black matrix) of Embodiment 3 may be made from a resin material.

The following illustrates the functions of the present invention.

According to one aspect of the present invention, a liquid crystal display device comprising an outflow preventing portion having a plurality of concave portions and formed on the vicinity of the resin sealing material for adhering a pair of substrates together is provided. The outflow preventing portion is provided such that at least a part thereof overlaps with the sealing material. Thus, even when the resin component of the sealing material flows out at the time of adhering the substrate together, the flowed resin component is collected in the concave portions of the outflow preventing portion, and does not reach the display portion. Therefore, it is possible to stably prevent the poor display caused by the outflow of the sealing material regardless of the load and heating conditions at the time of the manufacture (adhering of the substrates). As a result, the process margin and yield at the time of the manufacture are significantly improved.

In one preferred embodiment, a plurality of the concave portions of the outflow preventing portion are alternatively arranged on either side of one straight line. The adjacent concave portions arranged on either side of the straight line are at least in contact or overlap with each other, and the concave portions arranged on the same side of the straight line are separated from each other by a flat portion. According to such a structure, since each concave portion is small, it is possible to prevent a poor cell gap (an uneven cell gap) in the vicinity of the concave portions. Also, even when bubbles are contained in the flowed resin component collected in one concave portion, they hardly affect the entire sealing property, since each concave portion is small. In addition, because the outflow preventing portion is sufficiently functional, the poor display caused by the sealing material can be adequately prevented.

In another preferred embodiment, the depth of each concave portion is 5000 angstroms or more. In this case, each concave portion has a small area, but can collect a large amount of the flowed resin component. Therefore, it is possible to minimize its adverse effect on the size of the liquid crystal display device. The outflow preventing portion provides excellent effect whether it is formed on the TFT substrate or the color filter substrate.

According to another aspect of the present invention, a process for producing the above-described liquid crystal display device is provided. This process comprises adhering a substrate having an outflow preventing portion formed therein to a substrate having a sealing material formed thereon so as not to overlap the outflow preventing portion with the sealing portion; and pressing a pair of the adhered substrates to deform the sealing material into a compressed shape, and overlapping at least a part of the outflow preventing portion with the sealing material when the gap of the substrates reaches the prescribed gap. According to such a process, the sealing material is collected in the concave portions as pushing out the bubbles of the concave portions of the outflow preventing portion, and deformed to the prescribed sealing width and cell gap. Therefore, since no bubbles remain in the sealing material, the sealing property can be largely improved. On the other hand, when an outflow preventing portion is formed on the display portion side from the sealing material in such as manner that it is not contacted with the sealing material, it must be formed at a location not affecting the display. Thus, the distance between the sealing material and the display portion may be enlarged, which results in a large-scale liquid crystal display device. Alternatively, when the outflow preventing portion is previously formed in a portion in which the sealing material is formed, large bubbles are trapped in the concave portions at the time of the formation of the sealing material, which results in an inadequate sealing property.

According to still another aspect of the present invention, a liquid crystal display device comprising a first substrate having a switching element, an interlayer insulating film formed on the switching element, and a pixel electrode formed on the interlayer insulating film; a second substrate adhered together to the first substrate by a sealing material at the prescribed gap; and a liquid crystal layer disposed in a space defined by a pair of said substrates and the sealing material, is provided. This liquid crystal display device comprises an adhesion reinforcing portion formed in at least a part of the interlayer insulating film contacting with the sealing material. A pair of the substrates of the liquid crystal display device is adhered together by the sealing material with an adequate adhesive strength by the formation of the adhesion reinforcing portion. As a result, a liquid crystal display device having excellent mechanical strength as well as sealing property can be obtained.

In a preferred embodiment, the adhesion reinforcing portion is formed in the corner portions of the interlayer insulating film. It is possible to increase the adhesive strength without affecting the display characteristic of the liquid crystal display device by the formation of the adhesion reinforcing portion in the corner portions of the interlayer insulating film.

According to still another aspect of the present invention, the outflow preventing portion is formed under the sealing material. Thus, a structure that the cell gap of the sealing material is greater than the cell gap of the liquid crystal layer can be accomplished in the active matrix substrate, and the outflow and gushing of the resin material of the sealing material due to the compression of the sealing material at the time of adhering together the substrates can be prevented. Since the outflow preventing portion can be formed at the same time of the formation of the contact hole by using a photosensitive resin as the interlayer insulating film, this procedure can readily be introduced into the existing production lines. As a result, it is possible to prevent the poor display caused by the outflow and gushing of the resin component of the sealing material without increasing the production steps. Therefore, it is possible to improve the process margin of the production steps and the percentage of good items.

In a preferred embodiment, a transparent conductive film is formed on the outflow preventing portion. Thus, even when a part of the interlayer insulating film is lifted, the film lifting does not lead to any defects because the transparent conductive film which constitutes a pixel electrode will suppress the film lifting. More preferably, the transparent conductive film covers the entire portion of the outflow preventing portion. Thus, the outflow preventing portion is not brought into contact with a chemical liquid (for example, an etchant) in the subsequent production steps. As a result, the film lifting and peeling are further prevented.

Moreover, by forming the transparent conductive film in regions other than a region corresponding to the line formed under the outflow preventing portion, it is possible to prevent a poor display caused by a capacity coupling of the lines through the transparent conductive film. Alternatively, the poor display caused by the capacity coupling can be prevented by forming the transparent conductive films in regions corresponding to the lines formed under the outflow preventing portion and then electrically separating the transparent conductive films from each other. Also, the film lifting and peeling in the electrically separated portion (i.e., a portion in which the transparent conductive film is not formed) can be prevented by forming a convex portion or a portion defined by removing the interlayer insulating film in the outflow preventing portion corresponding to the electrically separated portion. Since the transparent conductive film may be formed on the outflow preventing portion at the time of the formation of the pixel electrode, there is no need to increase the number of the steps. Therefore, it is possible to suppress the production of poor items without the reduction of the production efficiency.

As described above, according to the present invention, a liquid crystal display device having excellent sealing property as well as reliability and without any poor display caused by the sealing material can be obtained without the reduction of the production efficiency.

The liquid crystal display device of the present invention is suitably used as, for example, a display means for computers, word processors, and the like.

Various other modifications will be apparent to and can be readily made by those skilled in the art without departing from the scope and spirit of this invention. Accordingly, it is not intended that the scope of the claims appended hereto be limited to the description as set forth, but rather that the claims be broadly construed.

What is claimed is:

1. A liquid crystal display device, comprising:
   an active matrix substrate including a plurality of scanning lines and signal lines crossing each other, switching elements arranged in a matrix, said switching elements receiving scanning signals from said scanning lines and input signals from said signal lines, and pixel electrodes provided corresponding to said switching elements;
   a color filter substrate including color filter layers and a black matrix and adhered to said active matrix substrate by a sealing material at a prescribed gap; and
   a liquid crystal layer disposed between said active matrix substrate and said color filter substrate,
   wherein an interlayer insulating film is provided between said scanning and signal lines and said pixel electrode and in a region including a region in which said sealing material is disposed, and an outflow preventing portion is provided in said interlayer insulating film under said sealing material.

2. The liquid crystal display device according to claim 1, wherein said outflow preventing portion comprises two or more portions having different thicknesses.

3. The liquid crystal display device according to claim 2, wherein said outflow preventing portion comprises a portion having the same thickness as that of said interlayer insulating film formed in a region corresponding to said pixel electrode, and a portion defined by removing a part of said interlayer insulating film.

4. The liquid crystal display device according to claim 2, wherein said outflow preventing portion comprises three or more portions having different thicknesses, and said three or more portions having different thicknesses include a portion having the same thickness as that of said interlayer insulating film formed in a region corresponding to said pixel electrode, and a portion defined by removing a part of said interlayer insulating film.

5. The liquid crystal display device according to claim 1, wherein a transparent conductive film of the same material as said pixel electrode is provided on said outflow preventing portion.

6. The liquid crystal display device according to claim 5, wherein said transparent conductive film is provided so as to cover the entire portion of said outflow preventing portion.

7. The liquid crystal display device according to claim 5, wherein said transparent conductive film is provided in regions other than a region corresponding to a line formed under said outflow preventing portion.

8. The liquid crystal display device according to claim 5, wherein said transparent conductive film is provided in regions corresponding to lines formed under said outflow preventing portion, and wherein said transparent conductive film is separated into film portions and the separations are provided in the regions corresponding to spaces between said lines.

9. The liquid crystal display device according to claim 8, wherein at least one convex portion is provided in said outflow preventing portion at a location corresponding to one of the separations in said transparent conductive film.

10. The liquid crystal display device according to claim 8, wherein at least one portion defined by removing a part of the interlayer insulating film is provided in the outflow preventing portion at a location corresponding to one of the separations in said transparent conductive film.

11. A liquid crystal display device comprising:

first and second spaced apart substrates, the first substrate comprising switching elements disposed at intersections of scanning lines and signal lines, and pixel electrodes electrically connected to the switching elements via openings formed in an interlayer insulating film, and the second substrate comprising color filter layers;

a liquid crystal layer sealed in the space between the first and second substrates by a sealing material; and an outflow limiting portion comprising a plurality of concave portions formed in a portion of the interlayer insulating film under the sealing material.

12. The liquid crystal display device according to claim 11, wherein the concave portions are formed in a reduced-thickness portion of the interlayer insulating film.

13. The liquid crystal display device according to claim 11, wherein the concave portions are arranged in a checkerboard pattern.

14. The liquid crystal display device according to claim 11, wherein the spacing between the concave portions corresponds to the pitch of the pixel electrodes.

15. A liquid crystal display device comprising:

first and second spaced apart substrates, the first substrate comprising switching elements disposed at intersections of scanning lines and signal lines, and pixel electrodes electrically connected to the switching elements via openings formed in an interlayer insulating film, and the second substrate comprising color filter layers;

a liquid crystal layer sealed in the space between the first and second substrates by a sealing material;

an outflow limiting portion formed in a portion of the interlayer insulating film under the sealing material; and a conductive layer disposed at least between the sealing material and the interlayer insulating film.

16. The liquid crystal display device according to claim 15, wherein the conductive layer covers the outflow limiting portion.

17. The liquid crystal display device according to claim 15, wherein the conductive layer is formed from the same material as the pixel electrodes.

18. The liquid crystal display device according to claim 15, further comprising:

conductive lines formed under the interlayer insulating film in the vicinity of the sealing material, wherein the conductive layer includes gaps at locations above the conductive lines.

19. The liquid crystal display device according to claim 15, further comprising:

spaced-apart conductive lines formed under the interlayer insulating film in the vicinity of the sealing material, wherein the conductive layer includes a gap formed at a location above the space between the conductive lines.

20. The liquid crystal display device according to claim 15, wherein the outflow limiting portion comprises one or more film peeling preventing portions.

21. The liquid crystal display device according to claim 20, wherein the film peeling preventing portions have a convex shape.

22. The liquid crystal display device according to claim 20, wherein the film peeling preventing portions have a concave shape.

* * * * *